(12) United States Patent
Fakoorian et al.

(10) Patent No.: US 11,696,297 B2
(45) Date of Patent: Jul. 4, 2023

(54) TECHNIQUES FOR RELEASE VALIDATION OF UPLINK CONFIGURED GRANT AND SEMI-PERSISTENT SCHEDULING

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Aleksandar Damnjanovic, Del Mar, CA (US); Seyedkianoush Hosseini, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 198 days.

(21) Appl. No.: 17/089,590

(22) Filed: Nov. 4, 2020

(65) Prior Publication Data
US 2021/0144686 A1    May 13, 2021

Related U.S. Application Data

(60) Provisional application No. 62/933,025, filed on Nov. 8, 2019.

(51) Int. Cl.
*H04W 72/23* (2023.01)
*H04L 1/1812* (2023.01)

(52) U.S. Cl.
CPC .......... *H04W 72/23* (2023.01); *H04L 1/1812* (2013.01)

(58) Field of Classification Search
CPC ... H04L 1/1812; H04L 1/1887; H04L 1/1896; H04L 5/0053; H04L 5/0091; H04W 72/042; H04W 72/14
See application file for complete search history.

(56) References Cited

U.S. PATENT DOCUMENTS 10,587,363 B2 *   3/2020   Zhou ................ H04L 1/0009
10,778,367 B2 *   9/2020   Zhou ................ H04L 1/0027
(Continued)

FOREIGN PATENT DOCUMENTS

CN    111052646 A  *  4/2020   .......... H04L 1/1812
CN    111867115 A  * 10/2020   .......... H04L 1/1812
(Continued)

OTHER PUBLICATIONS

Huawei et al., Enhanced UL configured grant transmission, Aug. 26, 2019, Agenda Item 7.2.6.6, 3GPP TSG RAN WG1 Meeting #98, Tdoc: R1-1908056 (Year: 2019).*
(Continued)

*Primary Examiner* — Eric Nowlin
(74) *Attorney, Agent, or Firm* — Holland & Hart LLP

(57) ABSTRACT

Methods, systems, and devices for wireless communications are described that support techniques for release validation of uplink configured grants and semi-persistent scheduling (SPS). For example, downlink SPS and uplink configured grants may be released using non-fallback downlink control information (DCI). In such cases, a resource allocation field within the DCI may be based on a type of resource allocation configured for the UE, which may enable an invalid assignment to be indicated to the UE for release of the semi-statically configured communications. In other cases, the fields within the DCI may include predefined values that are used for indicating the release. A UE may validate whether the DCI activates or releases the downlink SPS or uplink configured grant based on the value of bit fields within the DCI.

71 Claims, 17 Drawing Sheets

(56) References Cited

U.S. PATENT DOCUMENTS

| | | | | |
|---|---|---|---|---|
| 10,855,396 | B2* | 12/2020 | Zhou | H04B 17/327 |
| 10,965,434 | B1* | 3/2021 | Babaei | H04L 5/0096 |
| 10,973,015 | B2* | 4/2021 | Bae | H04L 1/189 |
| 2018/0373588 | A1* | 12/2018 | Debrosse et al. | H04W 72/042 |
| 2019/0207667 | A1* | 7/2019 | Zhou | H04B 17/327 |
| 2019/0207705 | A1* | 7/2019 | Zhou | H04B 7/0695 |
| 2019/0208436 | A1* | 7/2019 | Zhou | H04L 1/0026 |
| 2021/0014005 | A1* | 1/2021 | Ying | H04L 1/1887 |
| 2021/0153179 | A1* | 5/2021 | Bae | H04L 5/0053 |
| 2021/0185718 | A1* | 6/2021 | Ying | H04W 72/044 |
| 2021/0314126 | A1* | 10/2021 | Bae | H04W 72/14 |
| 2022/0131673 | A1* | 4/2022 | Huang | H04L 1/001 |

FOREIGN PATENT DOCUMENTS

| | | | | |
|---|---|---|---|---|
| CN | 111867115 | B * | 4/2022 | H04L 1/1812 |
| EP | 2995106 | B1 * | 7/2020 | H04L 1/1861 |
| EP | 3723313 | A1 * | 10/2020 | H04L 1/1822 |
| EP | 3567777 | B1 * | 2/2021 | H04L 1/1812 |
| EP | 3723313 | B1 * | 2/2022 | H04L 1/1822 |
| EP | 3989655 | A1 * | 4/2022 | |
| ES | 2863365 | T3 * | 10/2021 | H04L 1/1812 |
| JP | 2019220947 | A * | 12/2019 | H04L 1/1812 |
| JP | 6926146 | B2 * | 8/2021 | H04L 1/1812 |
| JP | 2021184627 | A * | 12/2021 | H04L 1/1812 |
| KR | 102185962 | B1 * | 12/2020 | |
| KR | 20200135926 | A * | 12/2020 | |
| KR | 102338531 | B1 * | 12/2021 | |
| WO | WO-2019139444 | A1 * | 7/2019 | H04L 5/0007 |
| WO | WO-2019216737 | A1 * | 11/2019 | H04L 1/1812 |
| WO | WO-2020017874 | A1 * | 1/2020 | H04L 5/0055 |
| WO | WO-2021040681 | A1 * | 3/2021 | H04W 72/042 |

OTHER PUBLICATIONS

Ericsson, Enhancement of Configured Grant for NR URLLC, Aug. 26, 2019, Agenda Item 7.2.6.6, 3GPP TSG RAN WG1 Meeting #98, Tdoc: R1-1908126 (Year: 2019).*

Vivo, Enhancement UL Configured Grant Transmissions for URLLC, Aug. 26, 2019, Agenda Item 7.2.6.6, 3GPP TSG RAN WG1 Meeting #98, Tdoc: R1-1908163 (Year: 2019).*

ZTE, Enhancements for UL Configured Grant Transmission, Aug. 26, 2019, Agenda Item 7.2.6.6, 3GPP TSG RAN WG1 Meeting #98, Tdoc: R1-1908240 (Year: 2019).*

Fujitsu, UL Configured Grant Transmission Enhancements for URLLC, Aug. 26, 2019, Agenda Item 7.2.6.6, 3GPP TSG RAN WG1 Meeting #98, Tdoc: R1-1908322 (Year: 2019).*

MediaTek, Inc., Enhancements for NR Configured-Grant, Aug. 26, 2019, Agenda Item 7.2.6.6, 3GPP TSG RAN WG1 Meeting #98, Tdoc: R1-1908413 (Year: 2019).*

Samsung, UL Configured Grants for eURLLC, Aug. 26, 2019, Agenda Item 7.2.6.6, 3GPP TSG RAN WG1 Meeting #98, Tdoc: R1-1908495 (Year: 2019).*

LG Electronics, Enhanced UL Configured Grant Transmission for NR URLLC, Aug. 26, 2019, Agenda Item 7.2.6.6, 3GPP TSG RAN WG1 Meeting #98, Tdoc: R1-1908546 (Year: 2019).*

CATT, Discussion on Enhanced UL Configured Grant Transmission, Aug. 26, 2019, Agenda Item 7.2.6.6, 3GPP TSG RAN WG1 Meeting #98, Tdoc: R1-1908599 (Year: 2019).*

Intel Corporation, Enhanced CG PUSCH Transmission, Aug. 26, 2019, Agenda Item 7.2.6.6, 3GPP TSG RAN WG1 Meeting #98, Tdoc: R1-1908650 (Year: 2019).*

OPPO, Configured Grant Enhancements for URLLC, Aug. 26, 2019, Agenda Item 7.2.6.6, 3GPP TSG RAN WG1 Meeting #98, Tdoc: R1-1908672 (Year: 2019).*

Sony, Enhanced UL Configured Grant Transmission for URLLC, Aug. 26, 2019, Agenda Item 7.2.6.6, 3GPP TSG RAN WG1 Meeting #98, Tdoc: R1-1908782 (Year: 2019).*

Panasonic, Discussion on URLLC Enhancements for Grant-Free Transmission, Aug. 26, 2019, Agenda Item 7.2.6.6, 3GPP TSG RAN WG1 Meeting #98, Tdoc: R1-1908801 (Year: 2019).*

Spreadtrum Communications, Discussion on UL Grant-Free Transmission Enhancements for URLLC, Aug. 26, 2019, Agenda Item 7.2.6.6, 3GPP TSG RAN WG1 Meeting #98, Tdoc: R1-1908944 (Year: 2019).*

Nokia et al., On Enhanced UL Configured Grant Transmission for NR URLLC and Activation/Release of Multiple SPS Configurations, Aug. 26, 2019, Agenda Item 7.2.6.6, 3GPP TSG RAN WG1 Meeting #98, Tdoc: R1-1908971 (Year: 2019).*

Sharp, On Enhanced UL Configured Grant Transmission, Aug. 26, 2019, Agenda Item 7.2.6.6, 3GPP TSG RAN WG1 Meeting #98, Tdoc: R1-1909104 (Year: 2019).*

Qualcomm Incorporated, Enhanced Grant-Free Transmission for eURLLC, Aug. 26, 2019, Agenda Item 7.2.6.6, 3GPP TSG RAN WG1 Meeting #98, Tdoc: R1-1909269 (Year: 2019).*

CAICT, Consideration on Enhanced UL Configured Grant Transmissions for URLLC, Aug. 26, 2019, Agenda Item 7.2.6.6, 3GPP TSG RAN WG1 Meeting #98, Tdoc: R1-1909354 (Year: 2019).*

Wilus Inc., Discussion on UL Configured Grant Enhancements for NR URLLC, Aug. 26, 2019, Agenda Item 7.2.6.6, 3GPP TSG RAN WG1 Meeting #98, Tdoc: R1-1909370 (Year: 2019).*

NTT Docomo, Inc., Summary for Rel. 16 7.2.6.6 Enhanced UL Configured Grant Transmission, Aug. 26, 2019, Agenda Item 7.2.6.6, 3GPP TSG RAN WG1 Meeting #98, Tdoc: R1-1909510 (Year: 2019).*

NTT Docomo, Inc., Offline Summary for 7.2.6.6 Enhanced UL Configured Grant Transmission, Aug. 26, 2019, Agenda Item 7.2.6.6, 3GPP TSG RAN WG1 Meeting #98, Tdoc: R1-1909784 (Year: 2019).*

Spreadtrum Communications, Discussion on UL Grant-Free Transmission Enhancements for URLLC, Aug. 26, 2019, Agenda Item 7.2.6.6, 3GPP TSG RAN WG1 Meeting #98, Tdoc: R1-1910020 (Year: 2019).*

Huawei et al., Enhanced UL Configured Grant Transmission, Aug. 26, 2019, Agenda Item 7.2.6.6, 3GPP TSG RAN WG1 Meeting #98, Tdoc: R1-1910071 (Year: 2019).*

ZTE, Enhanced for UL Configured Grant Transmission, Oct. 14, 2019, Agenda Item 7.2.6.6, 3GPP TSG RAN WG1 Meeting #98bis, Tdoc: R1-1910105 (Year: 2019).*

Fujitsu, UL Configured Grant Transmission Enhancements for URLLC, Oct. 14, 2019, Agenda Item 7.2.6.6, 3GPP TSG RAN WG1 Meeting #98bis, Tdoc: R1-1910188 (Year: 2019).*

Vivo, Enhanced UL Configured Grant Transmissions for URLLC, Oct. 14, 2019, Agenda Item 7.2.6.6, 3GPP TSG RAN WG1 Meeting #98bis, Tdoc: R1-1910226 (Year: 2019).*

Samsung, UL Configured Grants for eURLLC, Oct. 14, 2019, Agenda Item 7.2.6.6, 3GPP TSG RAN WG1 Meeting #98bis, Tdoc: R1-1910488 (Year: 2019).*

Ericsson, Enhancement of Configured Grant for NR URLLC, Oct. 14, 2019, Agenda Item 7.2.6.6, 3GPP TSG RAN WG1 Meeting #98bis, Tdoc: R1-1910550 (Year: 2019).*

OPPO, Configured Grant Enhancements for NR URLLC, Oct. 14, 2019, Agenda Item 7.2.6.6, 3GPP TSG RAN WG1 Meeting #98bis, Tdoc: R1-1910624 (Year: 2019).*

Intel Corporation, Enhancements to UL Configured Grant Transmission, Oct. 14, 2019, Agenda Item 7.2.6.6, 3GPP TSG RAN WG1 Meeting #98bis, Tdoc: R1-1910665 (Year: 2019).*

Sony, Enhanced UL Configured Grant Transmission for URLLC, Oct. 14, 2019, Agenda Item 7.2.6.6, 3GPP TSG RAN WG1 Meeting #98bis, Tdoc: R1-1910773 (Year: 2019).*

LG Electronics, Enhanced UL Configured Grant Transmission for URLLC, Oct. 14, 2019, Agenda Item 7.2.6.6, 3GPP TSG RAN WG1 Meeting #98bis, Tdoc: R1-1910831 (Year: 2019).*

Nokia et al., On Enhanced UL Configured Grant Transmission for NR URLLC and activation/release of multiple SPS configurations, Oct. 14, 2019, Agenda Item 7.2.6.6, 3GPP TSG RAN WG1 Meeting #98bis, Tdoc: R1-1910869 (Year: 2019).*

Panasonic, Discussion on URLLC enhancements for grant-free transmission, Oct. 14, 2019, Agenda Item 7.2.6.6, 3GPP TSG RAN WG1 Meeting #98bis, Tdoc: R1-1910992 (Year: 2019).*

Qualcomm Incorporated, Enhanced Grant-Free Transmissions for eURLLC, Oct. 14, 2019, Agenda Item 7.2.6.6, 3GPP TSG RAN WG1 Meeting #98bis, Tdoc: R1-1911123 (Year: 2019).*

(56) References Cited

OTHER PUBLICATIONS

CAICT, Consideration on Enhanced UL Configured Grant Transmissions for URLLC, Oct. 14, 2019, Agenda Item 7.2.6.6, 3GPP TSG RAN WG1 Meeting #98bis, Tdoc: R1-1911328 (Year: 2019).*

3GPP TS 38.212: "3rd Generation Partnership Project; Technical Specification Group Radio Access Network; NR; Multiplexing and Channel Coding (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. RAN WG1, No. V15.7.0, Sep. 28, 2019 (Sep. 28, 2019), pp. 1-101, XP051785088, Retrieved from the Internet: URL: ftp://ftp.3gpp.org/Specs/archive/38_series/38.212/38212-f70.zip 38212-f70.docx [retrieved on Sep. 28, 2019] section 7.3.1.1-section 7.3.1.2.2.

3GPP TS 38.214: "3rd Generation Partnership Project, Technical Specification Group Radio Access Network, NR, Physical Layer Procedures for Data (Release 15)", 3GPP Standard Technical Specification, 3rd Generation Partnership Project (3GPP), Mobile Competence Centre, 650 Route Des Lucioles, F-06921 Sophia-Antipolis Cedex, France, vol. RAN WG1, No. V15.7.0, Sep. 28, 2019 (Sep. 28, 2019), pp. 1-106, XP051785090, Retrieved from the Internet: URL: http://ftp.3gpp.org/Specs/archive/38_series/38.214/38214-f70.zip 38214-f70.docx [retrieved on Sep. 28, 2019] section 5.1.2.1; p. 11, Section 5.1.5; p. 28-p. 29 section 5.2.1.5.1; p. 42-p. 44, section 5.2.1.5.2, tables 5.2.1.5.2-2.

CATT: "Discussion on Enhanced UL Configured Grant Transmission", 3GPP TSG RAN WG1 Meeting #98bis, 3GPP Draft, R1-1910346, Chongqing, China, Oct. 14, 2019-Oct. 18, 2019, 5 Pages, Oct. 5, 2019 (Oct. 5, 2019), XP051808527, Retrieved from the Internet: URL: https://ftp.3gpp.org/tsg_ran/WG1_RL1/TSGR1_98b/Docs/R1-1910346.zip R1-1910346.docx [retrieved on Oct. 30, 2019] section 2.2.

International Search Report and Written Opinion—PCT/US2020/059115—ISA/EPO—dated Feb. 24, 2021.

Qualcomm Incorporated: "Enhanced Grant-Free Transmissions for eURLLC", 3GPP TSG-RAN WG1 #99, 3GPP Draft R1-1912964, Reno, Nevada, USA, pp. 1-4, Nov. 18, 2019-Nov. 22, 2019, Nov. 9, 2019 (Nov. 9, 2019), XP051823726, Retrieved from the Internet: URL: https://ftp.3gpp.org/tsg_ran/WG1_RL1/TSGR1_99/Docs/R1-1912964.zip R1-1912964 Enhanced Grant-Free Transmissions for eURLLC.docx [retrieved on Nov. 10, 2019] p. 3, Proposal 1-Proposal 2.

Wilus Inc: "Discussion on UL Configured Grant Enhancements for NR URLLC", 3GPP TSG RAN WG1 #8bis, 3GPP Draft, R1-1911319, Chongqing, China, Oct. 14, 2019-Oct. 20, 2019, Oct. 8, 2019 (Oct. 8, 2019), 3 Pages, XP051809317, Retrieved from the Internet: URL: https://ftp.3gpp.org/tsg_ran/WG1_RL1/TSGR1_98b/Docs/R1-1911319.zip R1-1911319_configured_grant final.docx [retrieved-on Oct. 30, 2019]—p. 1, last paragraph—p. 2; table 2.

\* cited by examiner

TECHNIQUES FOR RELEASE VALIDATION OF UPLINK CONFIGURED GRANT AND SEMI-PERSISTENT SCHEDULING

CROSS REFERENCE

The present Application for Patent claims the benefit of U.S. Provisional Patent Application No. 62/933,025 by Fakoorian et al., entitled "TECHNIQUES FOR RELEASE VALIDATION OF UPLINK CONFIGURED GRANT AND SEMI-PERSISTENT SCHEDULING" filed Nov. 8, 2019, assigned to the assignee hereof, and expressly incorporated by reference herein.

FIELD OF TECHNOLOGY

The following relates generally to wireless communications and more specifically to techniques for release validation of uplink configured grant and semi-persistent scheduling (SPS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support communications that are semi-statically configured by a base station (such as SPS or uplink configured grant communications). In such cases, downlink control information (DCI) may indicate, to a UE, the activation or release of the semi-statically configured communications. However, existing techniques for validating the activation or release of the semi-statically configured communications by a UE may be limited.

SUMMARY

The described techniques relate to improved methods, systems, devices, and apparatuses that support techniques for release validation of uplink configured grant and semi-persistent scheduling (SPS). Generally, the described techniques provide for semi-statically configured communications (e.g., downlink SPS and uplink configured grants (i.e., an Uplink Type 2 configured grant) that may be released through downlink control information (DCI). For instance, DCI (e.g., a non-fallback DCI) with a cyclic redundancy check (CRC) scrambled with configured scheduling radio network temporary identifier (CS-RNTI) may be used to release the semi-statically configured communications. In such cases, a base station may transmit the DCI on a control channel (e.g., physical downlink control channel (PDCCH)) to a user equipment (UE), and the UE may validate whether the DCI releases the downlink SPS or uplink Type 2 configured grant based on the value of bit fields within the DCI. For example, the value of the frequency domain resource assignment (FDRA) bit field within the non-fallback DCI may be based on a type of resource allocation (e.g., resource allocation type 1 or resource allocation type 0), where the FDRA bit field may be set to an invalid assignment (e.g., all 1's or all 0's) based on the resource allocation configuration. Setting the FDRA bit field with a value that indicates an invalid resource assignment in accordance with the resource allocation configuration may accordingly provide for the validation of scheduling release for downlink SPS and for uplink Type 2 configured grants. Additionally or alternatively, a set of predefined values for one or more bit fields of the DCI may indicate, to the UE, a release of the semi-statically configured communications, and the UE may identify the predetermined values to validate the release. In other examples, one or more additional fields within the DCI (e.g., fields that are different from the FDRA or modulation and coding scheme (MCS) fields) may be used to indicate an invalid assignment for validating the release of the semi-statically configured communications.

DETAILED DESCRIPTION

Figure 1:
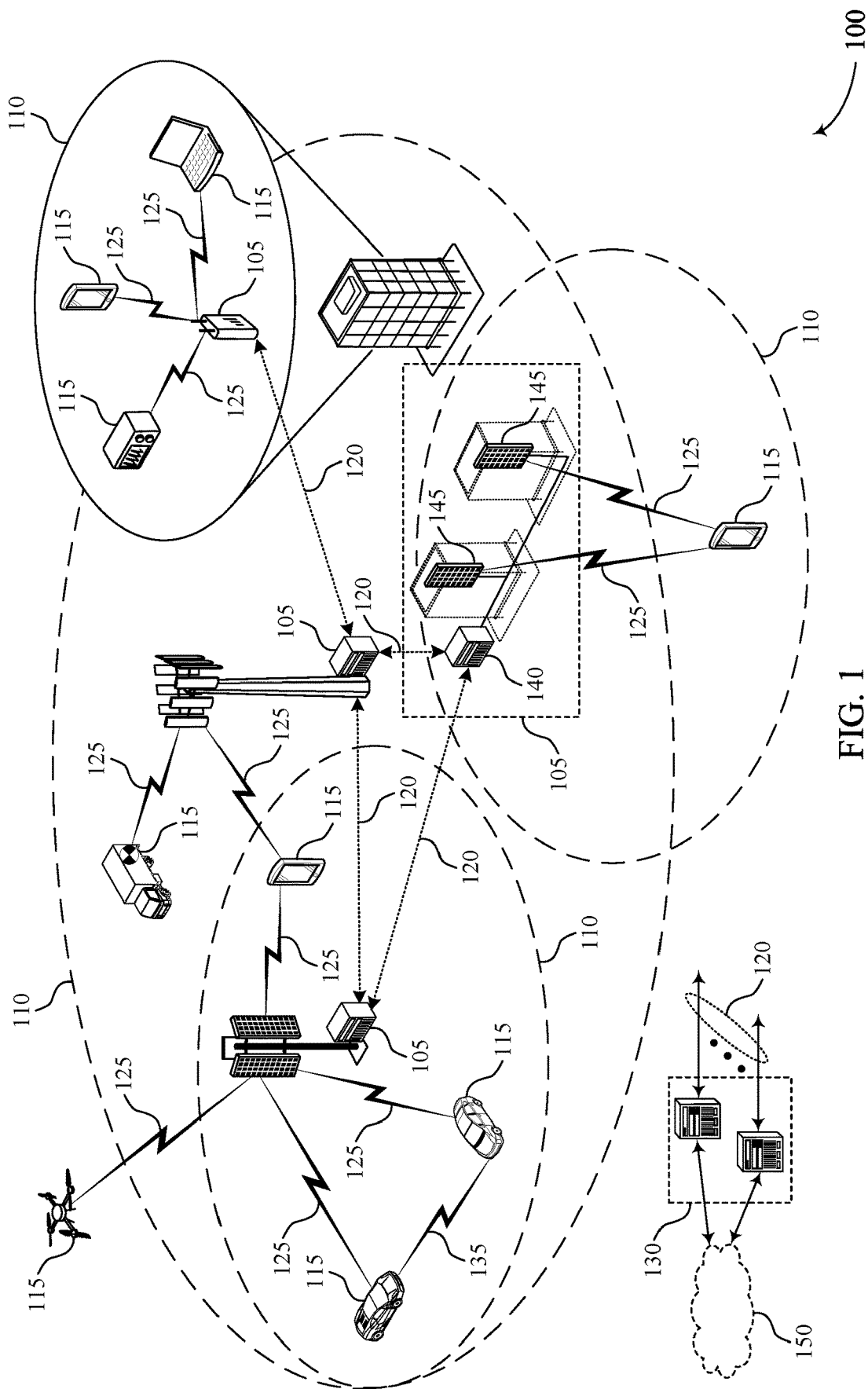
FIG. 1 illustrates an example of a wireless communications system that supports techniques for release validation of uplink configured grant and semi-persistent scheduling (SPS) in accordance with aspects of the present disclosure.

In some wireless communications systems, a base station may use semi-static grants and dynamic grants to allocate resources to a user equipment (UE) for communications with the base station. Semi-static grants may be transmitted in radio resource control (RRC) signaling and may sometimes be referred to as configured grants or semi-persistent scheduling (SPS). In addition to the semi-static signaling that allocates the resources for such communications, dynamic signaling may be used to activate or release a UE's operation using the semi-statically configured communications. For instance, once activated, a UE may operate using an uplink configured grant (e.g., a Type 2 uplink configured grant) or downlink SPS until the base station releases the configuration, at which point the UE may utilize or revert to another communications scheme.

Downlink SPS and Type 2 uplink configured grants may be activated and released through downlink control information (DCI) transmitted on a physical downlink control channel (PDCCH) from a base station. Here, a UE may validate whether the DCI activates or releases the downlink SPS or uplink Type 2 configured grant based on the values of bit fields within the DCI. Validation of the activation or release may be through the identification of an invalid (or nonexistent) value (or assignment) signaled in the DCI bit fields, such as an invalid modulation and coding scheme (MCS) value.

In some cases, a UE may validate a downlink SPS and uplink Type 2 configured grant scheduling release based on a fallback DCI (e.g., DCI format 0_0 and DCI format 1_0). The fallback DCI may include a set of parameters for the hybrid automatic repeat request (HARQ) process number, redundancy version (RV), MCS, and frequency domain resource assignment (FDRA) bit fields that are used by a UE to validate the release of downlink SPS and Uplink Type 2 configured grants. For example, the MCS bit field set to all 1's may correspond to an invalid MCS assignment (or a "reserved" MCS value), which may validate the release of either downlink SPS or an Uplink Type 2 configured grant. Similarly, the FDRA field of the fallback DCI may be set to all 1's to indicate and validate the release of these services, where the 1's of the FDRA field correspond to an invalid resource assignment. However, the use of fallback DCI for releasing semi-statically configured communications may be limiting. More specifically, the use of fallback DCI may not enable the configuration of SPS or Type 2 configured grant configurations across different component carriers.

In some examples, the use of non-fallback DCI may be associated with different resource allocation configurations, whereas fallback DCI may be associated with one type of resource allocation configuration. In particular, a fallback DCI may correspond to the use of resource allocation type 1, whereas a non-fallback DCI may use either resource allocation type 1, resource allocation type 0, or a dynamic switch resource allocation. As such, when resource allocation type 0 is configured, using all 1's within the FDRA field of non-fallback DCI may indicate a valid resource assignment. The valid FDRA resource assignment may therefore create issues for release validation by the UE, as an invalid resource is assignment is expected for indicating the release of the services. Thus, the use of non-fallback DCI for releasing SPS and uplink configured grants may involve different schemes for ensuring that an invalid assignment is provided within the fields of the DCI for release validation. Put another way, techniques for ensuring efficient release of semi-statically configured communications using non-fallback DCI may be desired.

In accordance with aspects of the present disclosure, wireless communications system may support the use of non-fallback DCI (e.g., DCI format 0_1 and DCI format 1_1), for validating downlink SPS and uplink Type 2 configured grant scheduling releases. The described techniques relate to the use of non-fallback DCI (or another type or format of DCI) scrambled with a configured scheduling radio network temporary identifier (CS-RNTI) for release validation of downlink SPS and uplink Type 2 configured grants. The value of an FDRA bit field within the non-fallback DCI may be based on the type of resource allocation (e.g., resource allocation type 1 or resource allocation type 0). The FDRA bit field may be set to all 1's or all 0's based on the resource allocation configuration. For example, when resource allocation type 1 is configured, the FDRA bit field may be set to all 1's. Likewise, when resource allocation type 0 is configured, the FDRA bit field may be set to all 0's. As such, the FDRA bit field may be set with a value that indicates an invalid resource assignment, which may accordingly provide for the validation of scheduling release for downlink SPS and for uplink Type 2 configured grants. In other words, the use of a value that does not correspond to a valid resource assignment may instead indicate the release of the configured grant or SPS. In the case of the resource allocation configured as dynamic switch, the FDRA bit field may be set to either all 1's or all 0's, as both of these values may point to an invalid resource assignment when the dynamic switch resource allocation is used.

In other cases, the values of the bit fields within the DCI may be restricted to a certain set of values that may be used to release of the configured services. The UE may identify these values within the DCI, and the UE may determine that the DCI is a valid release DCI. In other examples, one or more other bit fields within DCI (e.g., other than HARQ process number, MCS, or FDRA fields) may be used for the validation of a release DCI.

Particular aspects of the subject matter described herein may be implemented to realize one or more advantages. The described techniques may support improvements in release validation of uplink configured grants and downlink SPS, decreasing signaling overhead, and improving reliability, among other advantages. As such, supported techniques may include improved network operations and, in some examples, may promote network efficiencies, among other benefits. In particular, the use of non-fallback DCI with the described techniques may enable the release of configurations (such as SPS and Type 2 configured grant configurations) across different component carriers and provide additional flexibility in a wireless system.

Aspects of the disclosure are initially described in the context of wireless communications systems. Aspects of the disclosure are further illustrated by and described with reference to apparatus diagrams, system diagrams, and flowcharts that relate to techniques for release validation of uplink configured grant and SPS.

FIG. 1 illustrates an example of a wireless communications system 100 that supports techniques for release validation of uplink configured grant and SPS in accordance with aspects of the present disclosure. The wireless communications system 100 may include one or more base stations 105, one or more UEs 115, and a core network 130.

In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit a DCI (e.g., non-fallback DCI) on a control channel to UE 115. A UE 115 may validate whether the DCI activates or releases a downlink SPS or uplink Type 2 configured grant based on the value of bit fields within the DCI. For example, the value of the FDRA bit field within the non-fallback DCI may be based on the type of resource allocation (e.g., resource allocation type 1 or resource allocation type 0). The FDRA bit field may be set to all 1's or all 0's based on the resource allocation configuration. The FDRA bit field may be set with a value that indicates an invalid resource assignment, which may accordingly provide for the validation of scheduling release for downlink SPS and for uplink Type 2 configured grants. Additionally or alternatively, a set of predefined values for one or more bit fields of the DCI may indicate, to the UE 115, a release of the semi-statically configured communications, and the UE may identify the predetermined values to validate the release. In other examples, one or more additional fields within the DCI (e.g., fields that are different from the FDRA or MCS fields) may be used to indicate an invalid assignment for validating the release of the semi-statically configured communications.

Figure 2:
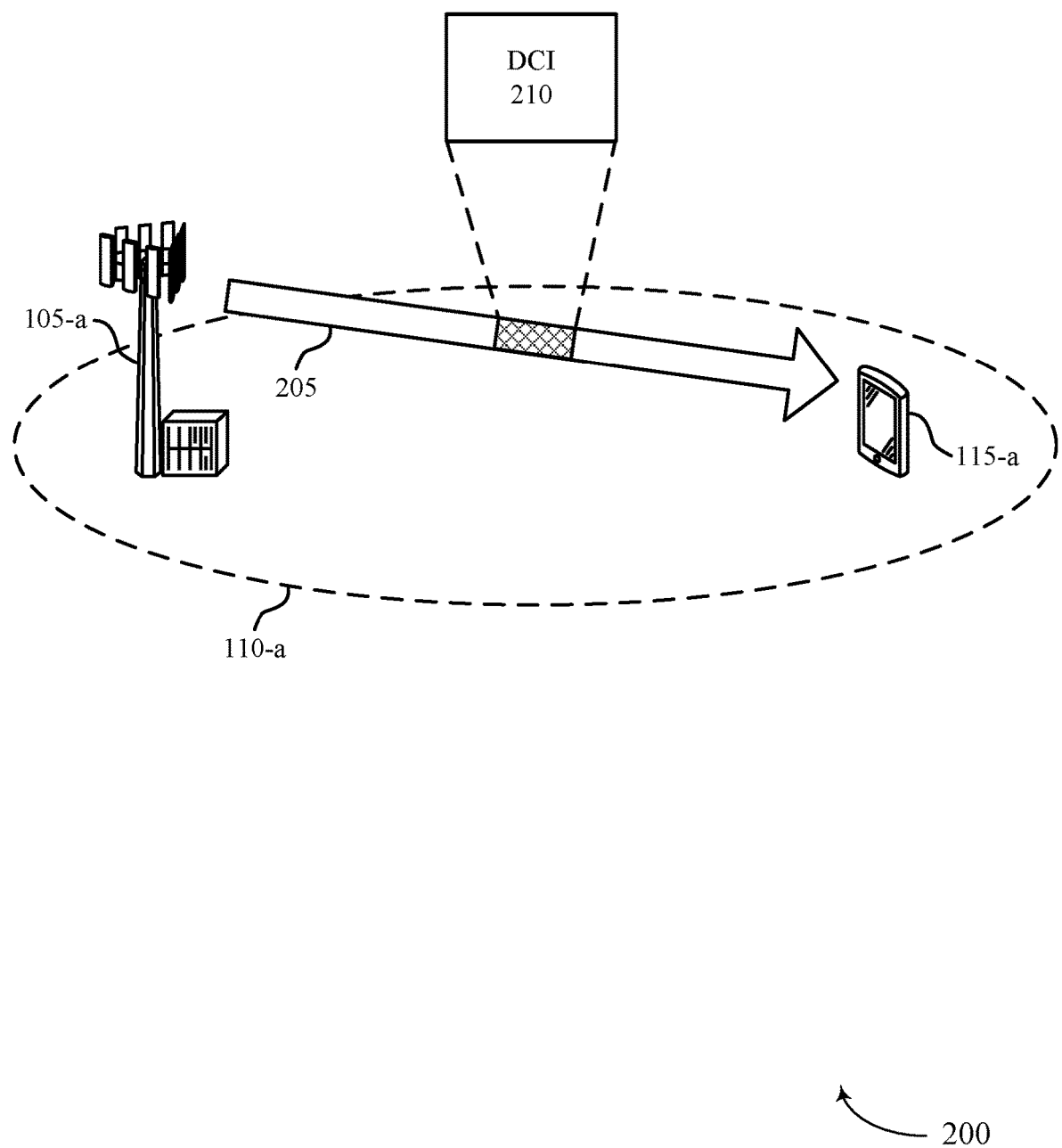
FIG. 2 illustrates an example of a wireless communications system that supports techniques for release validation of uplink configured grant and SPS in accordance with aspects of the present disclosure.

FIG. 2 illustrates an example of a wireless communications system 200 that supports techniques for release validation of uplink configured grant and SPS in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described above with reference to FIG. 1. In some cases, UE 115-a and base station 105-a may communicate on resources of a communication link 205 (e.g., a channel or a beam).

Base station 105-a may provide a coverage area 110-a within which UE 115-a and base station 105-a may perform communications via communication link 205. Base station 105-a may semi-statically configure and allocate resources for UE 115-a to send transmissions. For instance, base station 105-a may configure SPS communications and/or an uplink configured grant (e.g., Type 2 uplink configured grant) for UE 115-a via RRC signaling. Base station 105-a may then dynamically activate (and later release) SPS or the uplink configured grant through the transmission of DCI.

As such, base station 105-a may transmit DCI 210 to UE 115-a in a PDCCH to indicate a transmission configuration (e.g., downlink SPS or uplink configured grants (i.e., an uplink Type 2 configured grant)) that UE 115-a may use for transmissions. The DCI 210 may indicate the activation or release of the downlink SPS or Uplink Type 2 configured grant. UE 115-a may validate if the DCI 210 activates or releases the downlink SPS or uplink configured grant based on the values of bit fields within the DCI 210. In some cases, the DCI 210 may be a non-fallback DCI (e.g., DCI format 0_1 and DCI format 1_1) with a CRC scrambled with CS-RNTI, for validating downlink SPS or uplink Type 2 configured grant scheduling release. In other cases, DCI 210 may include a new DCI with a CRC scrambled with CS-RNTI. DCI 210 may include a set of parameters for the HARQ process number, RV, MCS, or FDRA bit fields. UE 115-a may validate if downlink SPS or uplink configured grant are activated or released based on values assigned to the set of parameters.

In some cases, various resource allocation configurations may be configured for UE 115-a, where base station 105-a may use higher-layer signaling to configure various types of resource allocations. In one aspect, the resource allocation configurations may be configured via an RRC message which is transmitted by base station 105-a and received by UE 115-a. As an example, base station 105-a may use a higher layer parameter resourceAllocation (e.g., in a configuration for PDSCH (pdsch-Config) and in a configuration for PUSCH (pusch-Config)), which may determine whether a resource allocation is bitmap-based (e.g., Type 0 resource allocation) or resource indicator value (RIV)-based (e.g., Type 1 resource allocation). Here, when the resourceAllocation parameter is configured to "resourceAllocation-Type1," the frequency resource allocation may be Type 1, which may correspond to the FDRA field of the DCI 210. In another example, when the resourceAllocation parameter is configured to "resourceAllocationType0," the frequency resource allocation may be Type 0, which may likewise correspond to the FDRA field of the DCI 210. Additionally or alternatively, the resourceAllocation parameter may be configured to "dynamicswitch," where a most significant bit (MSB) of the FDRA field in DCI 210 may indicate the resource assignment type, for example, with a bit value of 0 indicating resource allocation Type 0 and a bit value of 1 indicating resource allocation Type 1.

The value of the FDRA bit field within the non-fallback DCI may be based on the type of resource allocation (e.g., resource allocation type 1 or resource allocation type 0). For example, the FDRA bit field may be set to all 1's (e.g., 11 when the bit field has a size or bit width of bits) or all 0's (e.g., 00 when the bit field has a size or bit width of 2 bits) based on the resource allocation configuration. In some cases, when resource allocation type 1 is configured, the FDRA bit field may be set to all 1's. In other cases, when resource allocation type 0 is configured, the FDRA bit field may be set to all 0's. As such, the FDRA bit field may be set with a value that indicates an invalid resource assignment, which may provide for the validation of scheduling release for downlink SPS or for Uplink Type 2 configured grants. In some cases, the resource allocation may be configured as a dynamic switch, in which the FDRA bit field may be set to either all 1's or all 0's, as both of these values may point to an invalid resource assignment when the dynamic switch resource allocation is used.

Base station 105-a may prepare multiple downlink SPS or Uplink Type 2 configured grants which may be jointly released by the DCI 210. The DCI 210 may include a configuration index which indicates to UE 115-a which transmission configurations are released. The HARQ process number bit field in DCI 210 may indicate the configuration index for joint or separate releases of downlink SPS or uplink configured grants. UE 115-a may identify the resource allocation associated with a configured grant configuration with the index. The HARQ process number bit field indicating the index may allow UE 115-a to avoid misdetection of the activation (or retransmission) DCI 210 due to UE 115-a knowing definitively if the DCI 210 is an activation or release DCI.

In some cases, base station 105-a may be restricted to assigning a certain set of values to the bit fields within the DCI that may be used to release of the configured services. The certain set of values within the DCI may indicate to UE 115-a that the DCI is a valid release DCI. For example, base station 105-a may be restricted to assign a value of a FDRA including 1's, a value of a HARQ process field including 0's, a value of an RV field including 00, or a value of an MCS field including 1's. Thus, if UE 115-a identifies a value of a FDRA including 1's, a value of a HARQ process field including 0's, a value of an RV field including 00, or a value of an MCS field including 1's, UE 115-a may validate that DCI 210 is a release DCI for a downlink SPS release or for Uplink Type 2 configured grant. It is noted that these values and fields are provided for illustrative purposes only, and other fields may be configured with predetermined values that indicate the release of semi-statically configured communications, such as downlink SPS and type 2 uplink configured grants.

In some cases, to reduce false detection (e.g., between an activation or retransmission DCI and a release DCI) one or more other bit fields within DCI 210 (e.g., other than HARQ process number, RV, MCS, or FDRA fields) may be used for the validation of a release DCI by setting the bit field to an invalid assignment (e.g., invalid for purposes of resource assignment) in the release DCI. For example, upon receiving DCI 210 from base station 105-a, UE 115-a may validate the release of downlink SPS or uplink Type 2 configured grant based on a value of other bit fields indicating an invalid assignment besides the values of HARQ process number, RV, MCS, or FDRA fields. The bit fields for release validation may be the same or different for downlink SPS release and for uplink Type 2 configured grant release.

Figure 3:
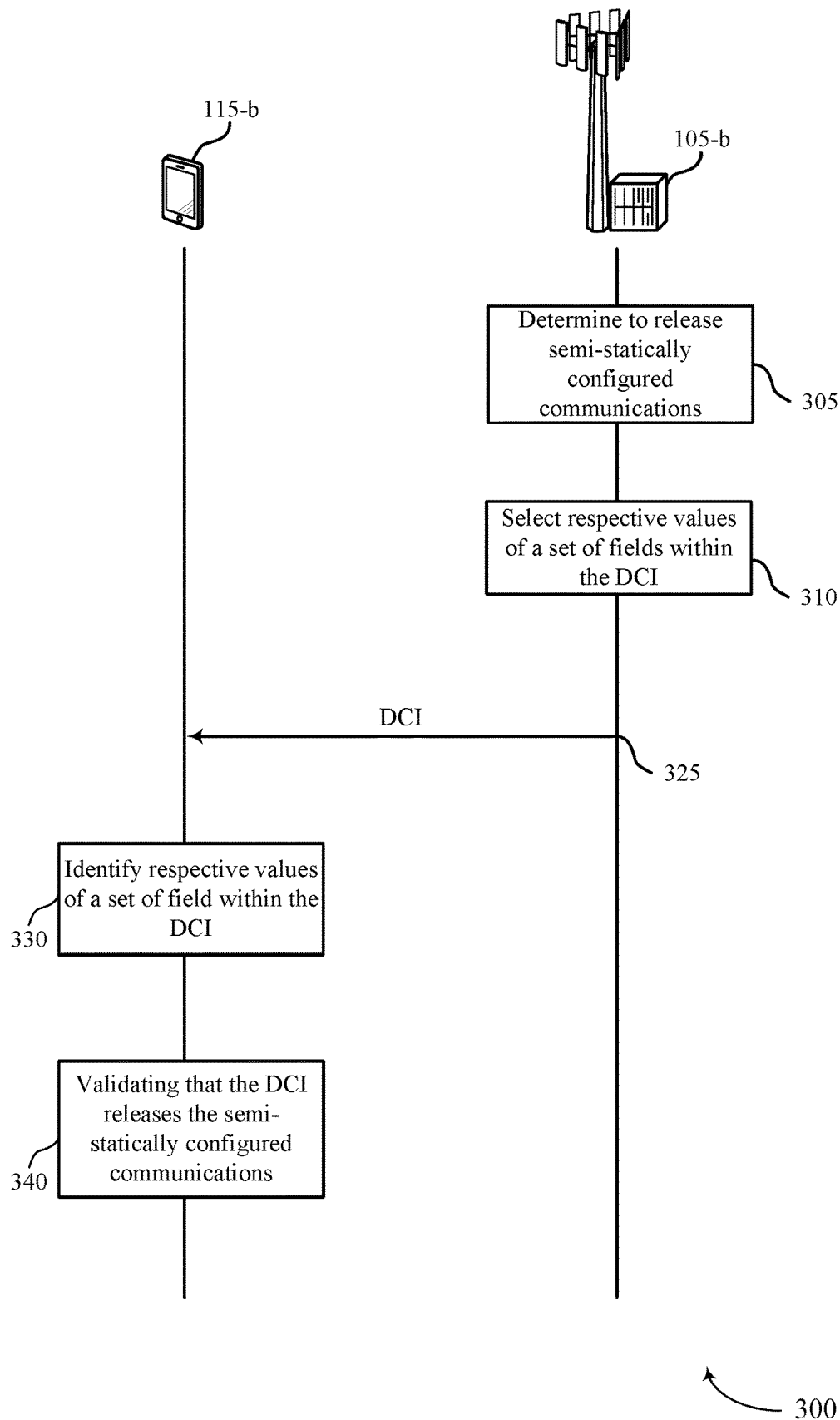
FIG. 3 illustrates an example of a process flow in a system that supports techniques for release validation of uplink configured grant and SPS in accordance with aspects of the present disclosure.

FIG. 3 illustrates an example of a process flow 300 in a system that supports techniques for release validation of uplink configured grant and SPS in accordance with aspects of the present disclosure. In some examples, process flow 300 may implement aspects of wireless communications system 100. Process flow 300 may include a base station 105-b and a UE 115-b, which may be examples of corresponding base stations 105 and UEs 115, respectively, as described above with reference to FIG. 1.

At 305, base station 105-b may determine to release semi-statically configured communications (e.g., downlink SPS or an uplink Type 2 configured grant) at UE 115-b. In some examples, base station 105-b may identify a configuration of a resource allocation type (e.g., resource allocation type 1 or resource allocation type 0). The configuration type may include a first type of resource allocation, and the value of the resource allocation field may be based on the first type of resource allocation. In some cases, the value of the resource allocation field may correspond to an invalid allocation. In a first example, the first type of resource allocation may include a bitmap-based resource allocation, and the value of the resource allocation field may include a set of 1's (e.g., a bit value of 11, a bit field set to all 1's). In a second example, the first type of resource allocation may include a resource indicator value-based resource allocation, where the value of the resource allocation field may include a set of 0's (e.g., bit value of 00, a bit field set to all 0's). In a third example, the first type of resource allocation may include a dynamic switch resource allocation type, and the value of the resource allocation field may include a set of 0's or a set of 1's.

The DCI may jointly release a set of configurations for semi-statically configured communications by identifying a configuration index for the semi-statically configured communications at UE 115-b and including, within at least one field (e.g., HARQ process number) of the DCI, the configuration index for indicating the semi-statically configured communications at UE 115-b to be released. In some cases, the format of the DCI includes format 0_1, where the semi-statically configured communications may include an uplink Type 2 configured grant. In other cases, the format of the DCI includes format 1_1, and where the semi-statically configured communications includes downlink SPS.

At 310, base station 105-b may select, based on the determination, respective values of a set of fields within the DCI (e.g., non-fall back DCI), each of the respective values of the set of fields comprising a predetermined value. In such cases, base station 105-b may select a value, based on the configuration of the resource allocation type, of a resource allocation field (e.g., the FDRA field) within the DCI (e.g., non-fall back DCI). In some cases, selecting the respective value of the set of fields may include selecting a value of a resource allocation field including a set of 1's, a value of a HARQ process field including a 0, a value of an RV field including 00, and a value of an MCS field includes a set of 0's, where validating that the DCI releases the semi-statically configured communications based on at least one of the value of the resource allocation field, the value of the RV field, the value of the HARQ process field, or the value of the MCS field.

Additionally or alternatively, at 310, base station 105-b may select, based on the determination, a value of one or more fields within the DCI, where the one or more fields are from at least a first set of fields or a second set of fields. The first set of fields may include a resource allocation field (e.g., an FDRA field), a HARQ process field, an RV field, and an MCS field, where the DCI that releases the semi-statically configured communications is based on a value of one or more fields from the second set of fields.

In some cases, base station 105-b may select a value of the first field of the first set of fields that indicates a release of semi-statically configured uplink communications at the UE and a release of semi-statically configured downlink communications at UE 115-b. The value of the first field may correspond to an invalid assignment, and the release of the semi-statically configured downlink communications is validated based on the invalid assignment. In other cases, base station 105-b may select a value of the first field of the first set of fields that indicates a release of semi-statically configured uplink communications at UE 115-b, where the value of the first field may correspond to an invalid assignment. In such cases, the release of the semi-statically configured communications is validated based on the invalid assignment.

At 325, base station 105-b may transmit, and UE 115-b may receive, the DCI (e.g., non-fall back DCI or another DCI with CRC scrambled with CS-RNTI) for releasing the semi-statically configured communications at UE 115-b. The release of the semi-statically configured communications may be based on the value of the resource allocation field within the DCI, the predetermined values of the set of fields, or the value of the one or more fields from the first set of fields or the second set of fields. In some cases, a CRC of the DCI may be scrambled using a CS-RNTI.

At 330, UE 115-b may identify respective values of a set of fields within the DCI, where a value of a resource allocation field from the set of fields may be based on a configured resource allocation type. The value of the resource allocation field may indicate an invalid assignment. In some cases, each of the respective values of the set of fields may include a predetermined value. In some examples, UE 115-b may identify, within the DCI, the first set of fields and the second set of fields different from the first set of fields. The first set of fields may include the resource allocation (e.g., FDRA) field, the HARQ process field, the RV field, and the MCS field. Additionally or alternatively, UE 115-b may identify a value of a second field of the second set of fields that indicates a release of semi-statically configured downlink communications at UE 115-b, where the value of the second field may correspond to an invalid assignment.

At 340, UE 115-b may validate that the DCI releases the semi-statically configured communications (e.g., downlink SPS or an uplink Type 2 configured grant). UE 115-b may validate the DCI based on the respective values that include the value of the resource allocation field, the predetermined values of the set of fields, or a value of one or more fields from the first set of fields or the second set of fields.

The resource allocation field may include a first value if the configured resource allocation type is a first type of resource allocation. In such cases, validating, by UE 115-b, that the DCI releases the semi-statically configured communications may be based on the value of the resource allocation field including a second value if the configured resource allocation type is a second type of resource allocation. Additionally or alternatively, validating, by UE 115-b, that the DCI releases the semi-statically configured communications may be based on the identified configuration index and the configured resource allocation type. In other cases, validating that the DCI releases the semi-statically configured communications may be based on a value of one or more fields from the second set of fields, where the value of the one or more fields corresponds to an invalid allocation.

Figure 4:
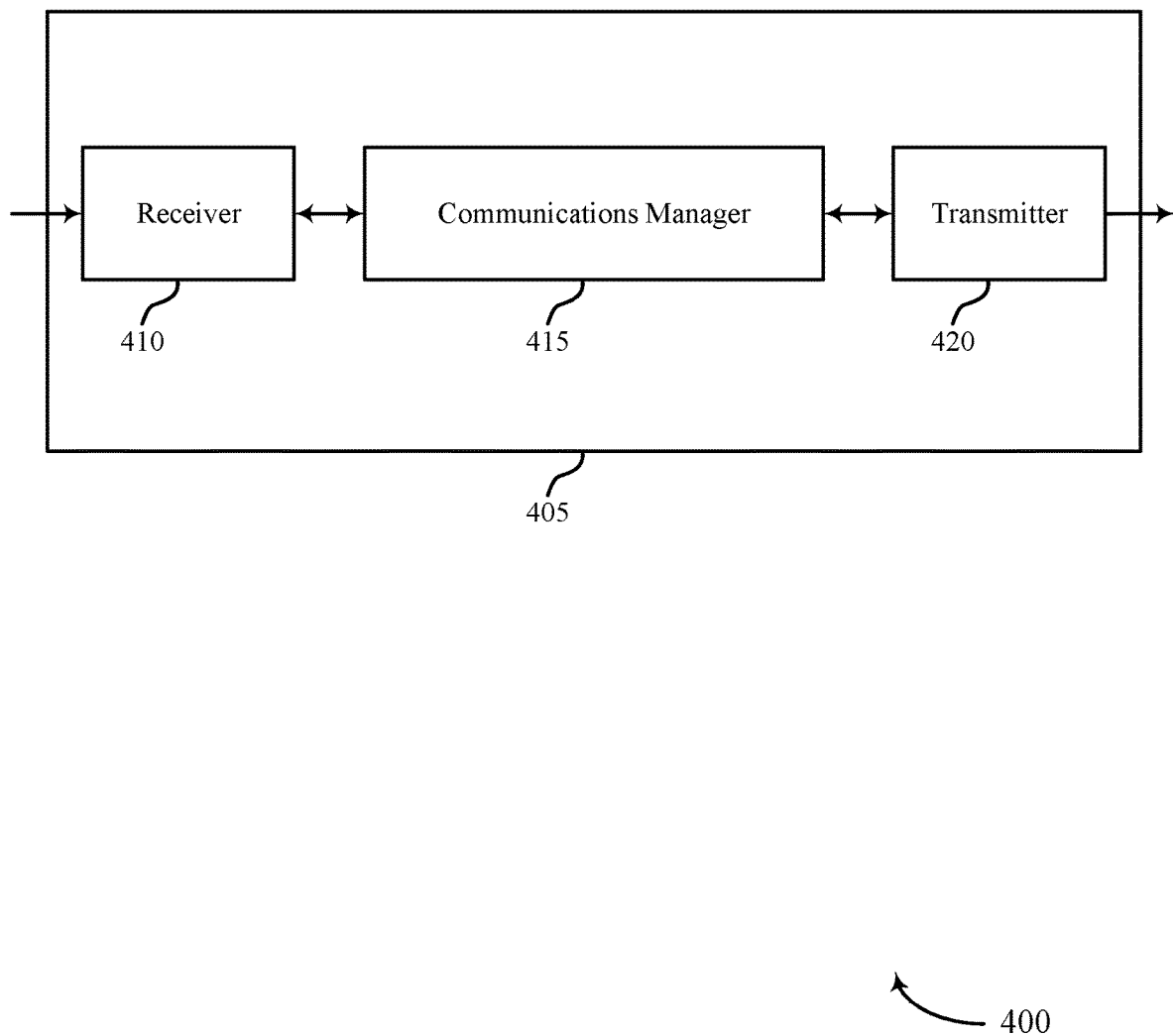
FIGS. 4 and 5 show block diagrams of devices that support techniques for release validation of uplink configured grant and SPS in accordance with aspects of the present disclosure.

FIG. 4 shows a block diagram 400 of a device 405 that supports techniques for release validation of uplink configured grant and SPS in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for release validation of uplink configured grant and SPS). Information may be passed on to other components of the device 405. The receiver 410 may be an example of aspects of the transceiver 720 described with reference to FIG. 7. The receiver 410 may utilize a single antenna or a set of antennas.

The communications manager 415 may receive DCI for releasing semi-statically configured communications at the UE, identify respective values of a set of fields within the DCI, where a value of a resource allocation field from the set of fields is based on a configured resource allocation type, and validate that the DCI releases the semi-statically configured communications based on the respective values that include the value of the resource allocation field. The communications manager 415 may also receive DCI for releasing semi-statically configured communications at the UE, identify respective values of a set of fields within the DCI, each of the respective values of the set of fields including a predetermined value, and validate that the DCI releases the semi-statically configured communications based on the predetermined values of the set of fields. The communications manager 415 may also receive DCI for releasing semi-statically configured communications at the UE, identify, within the DCI, a first set of fields and a second set of fields different from the first set of fields, and validate that the DCI releases the semi-statically configured communications based on a value of one or more fields from the first set of fields or the second set of fields. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to validate that a DCI releases the semi-statically configured communications. This validation may increase reliability and reduce latency during transmissions.

Based on techniques for release validation of uplink configured grant and downlink SPS as described herein, a processor of a UE 115 (e.g., controlling the receiver 410, the transmitter 420, or the transceiver 720 as described with reference to FIG. 7) may increase reliability and decrease signaling overhead in the communication because the UE 115 may avoid going through unnecessary configuration processes during transmissions.

Figure 5:
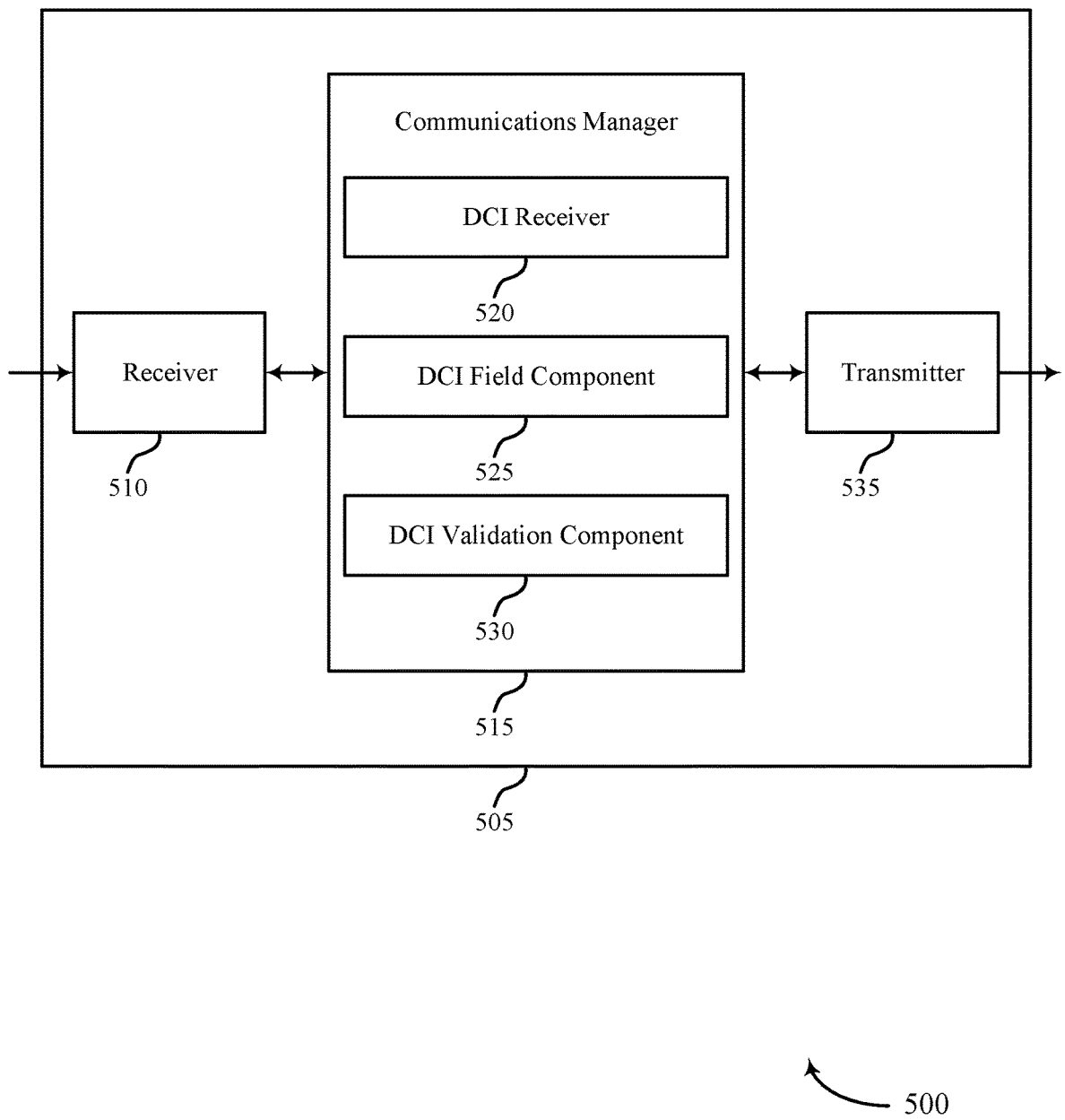

FIG. 5 shows a block diagram 500 of a device 505 that supports techniques for release validation of uplink configured grant and SPS in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques for release validation of uplink configured grant and SPS). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a DCI receiver 520, a DCI field component 525, and a DCI validation component 530. The communications manager 515 may be an example of aspects of the communications manager 710 described herein.

The DCI receiver 520 may receive DCI for releasing semi-statically configured communications at the UE. The DCI field component 525 may identify respective values of a set of fields within the DCI, where a value of a resource allocation field from the set of fields is based on a configured resource allocation type. The DCI validation component 530 may validate that the DCI releases the semi-statically configured communications based on the respective values that include the value of the resource allocation field.

The DCI receiver 520 may receive DCI for releasing semi-statically configured communications at the UE. The DCI field component 525 may identify respective values of a set of fields within the DCI, each of the respective values of the set of fields including a predetermined value. The DCI validation component 530 may validate that the DCI releases the semi-statically configured communications based on the predetermined values of the set of fields.

The DCI receiver 520 may receive DCI for releasing semi-statically configured communications at the UE. The DCI field component 525 may identify, within the DCI, a first set of fields and a second set of fields different from the first set of fields. The DCI validation component 530 may validate that the DCI releases the semi-statically configured communications based on a value of one or more fields from the first set of fields or the second set of fields.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

In some examples, the communications manager 515 may be implemented as an integrated circuit or chipset for a mobile device modem, and the receiver 510 and transmitter 535 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to validate that a DCI releases the semi-statically configured communications. This validation may increase reliability and reduce latency during transmissions. In addition, enabling the device 505 to validate operations associated with semi-statically configured communications (e.g., SPS or configured grant communications), may reduce signaling overhead and promote efficiencies within communications systems.

Based on techniques for release validation of uplink configured grant and downlink SPS as described herein, a processor of a UE 115 (e.g., controlling the receiver 510, the transmitter 535, or the transceiver 720 as described with reference to FIG. 7) may increase reliability and decrease signaling overhead in the communication because the UE 115 may avoid going through unnecessary configuration processes during transmissions.

Figure 6:
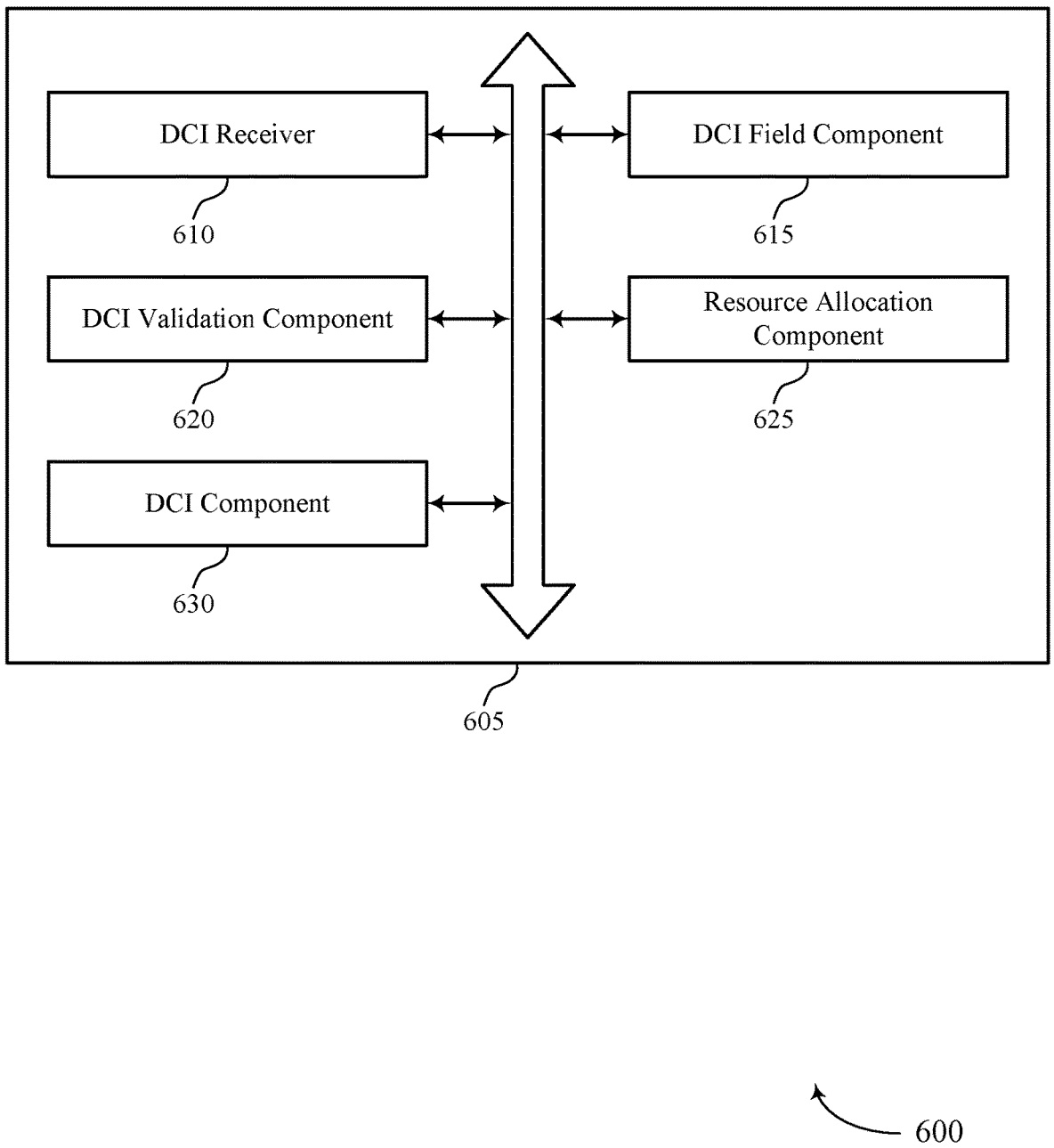
FIG. 6 shows a block diagram of a communications manager that supports techniques for release validation of uplink configured grant and SPS in accordance with aspects of the present disclosure.

FIG. 6 shows a block diagram 600 of a communications manager 605 that supports techniques for release validation of uplink configured grant and SPS in accordance with aspects of the present disclosure. The communications manager 605 may be an example of aspects of a communications manager 415, a communications manager 515, or a communications manager 710 described herein. The communications manager 605 may include a DCI receiver 610, a DCI field component 615, a DCI validation component 620, a resource allocation component 625, and a DCI component 630. Each of these modules may communicate, directly or indirectly, with one another (e.g., via one or more buses).

The DCI receiver 610 may receive DCI for releasing semi-statically configured communications at the UE. In some examples, the DCI receiver 610 may receive DCI for releasing semi-statically configured communications at the UE. In some examples, the DCI receiver 610 may receive DCI for releasing semi-statically configured communications at the UE.

The DCI field component 615 may identify respective values of a set of fields within the DCI, where a value of a resource allocation field from the set of fields is based on a configured resource allocation type. In some examples, the DCI field component 615 may identify respective values of a set of fields within the DCI, each of the respective values of the set of fields including a predetermined value.

In some examples, the DCI field component 615 may identify, within the DCI, a first set of fields and a second set of fields different from the first set of fields. In some examples, the DCI field component 615 may identify, from the first set of fields, a value of a first field that indicates a release of semi-statically configured uplink communications at the UE and a release of semi-statically configured downlink communications at the UE, the value of the first field corresponding to an invalid assignment, where validating that the DCI releases the semi-statically configured communications is based on the invalid assignment.

In some examples, the DCI field component 615 may identify, from the first set of fields, a value of a first field that indicates a release of semi-statically configured uplink communications at the UE, the value of the first field corresponding to an invalid assignment, where validating that the DCI releases the semi-statically configured communications is based on the invalid assignment.

In some examples, the DCI field component 615 may identify, from the second set of fields, a value of a second field that indicates a release of semi-statically configured downlink communications at the UE, the value of the second field corresponding to an invalid assignment, where validating that the DCI releases the semi-statically configured communications is based on the invalid assignment.

In some cases, the set of fields includes one or more of a resource allocation field, a HARQ process field, an RV field, or an MCS field, where validating that the DCI releases the semi-statically configured communications is based on at least one of a value of the resource allocation field, a value of the RV field, a value of the HARQ process field, or a value of the MCS field.

In some cases, at least one of the value of the resource allocation field, the value of the RV field, the value of the HARQ process field, or the value of the MCS field corresponds to an invalid assignment. In some cases, a value of the resource allocation field includes a set of 1's, a value of the HARQ process field includes a 0, a value of the RV field includes 00, and a value of the MCS field includes a set of 0's.

In some cases, the first set of fields includes a resource allocation field, a HARQ process field, an RV field, and an MCS field, and where validating that the DCI releases the semi-statically configured communications is based on a value of one or more fields from the second set of fields, where the value of the one or more fields corresponds to an invalid allocation.

The DCI validation component 620 may validate that the DCI releases the semi-statically configured communications based on the respective values that include the value of the resource allocation field. In some examples, the DCI validation component 620 may validate that the DCI releases the semi-statically configured communications based on the predetermined values of the set of fields.

In some examples, the DCI validation component 620 may validate that the DCI releases the semi-statically configured communications based on a value of one or more fields from the first set of fields or the second set of fields. In some examples, identifying the configured resource allocation type, where validating that the DCI releases the semi-statically configured communications includes.

In some examples, the DCI validation component 620 may identify, within at least one field of the set of fields, a configuration index for the semi-statically configured communications at the UE, where validating that the DCI releases the semi-statically configured communications is based on the identified configuration index and the configured resource allocation type. In some examples, validating that the DCI releases the semi-statically configured communications based on the value of the resource allocation field including a first value if the configured resource allocation type is a first type of resource allocation and validating that the DCI releases the semi-statically configured communications based on the value of the resource allocation field including a second value if the configured resource allocation type is a second type of resource allocation.

The resource allocation component 625 may identify that the configured resource allocation type includes a first type of resource allocation, the value of the resource allocation field being based on the first type of resource allocation, where the value of the resource allocation field corresponds to an invalid allocation.

In some cases, the first type of resource allocation includes a resource indicator value-based resource allocation, and where the value of the resource allocation field includes a set of 1's. In some cases, the first type of resource allocation includes a bitmap-based resource allocation, and where the value of the resource allocation field includes a set of 0's. In some cases, the first type of resource allocation includes a dynamic switch resource allocation type, and where the value of the resource allocation field includes a set of 0's or a set of 1's.

The DCI component 630 may identifying the configured resource allocation type. In some cases, the DCI includes non-fall back DCI. In some cases, a format of the DCI includes format 0_1, and where the semi-statically configured communications include an uplink Type 2 configured grant. In some cases, a format of the DCI includes format 1_1, and where the semi-statically configured communications include downlink SPS. In some cases, a CRC of the DCI is scrambled using a CS-RNTI.

In some examples, the semi-statically configured communications comprise at least one of downlink SPS or an uplink Type 2 configured grant. In some cases, the semi-statically configured communications include at least one of downlink SPS or an uplink Type 2 configured grant.

Figure 7:
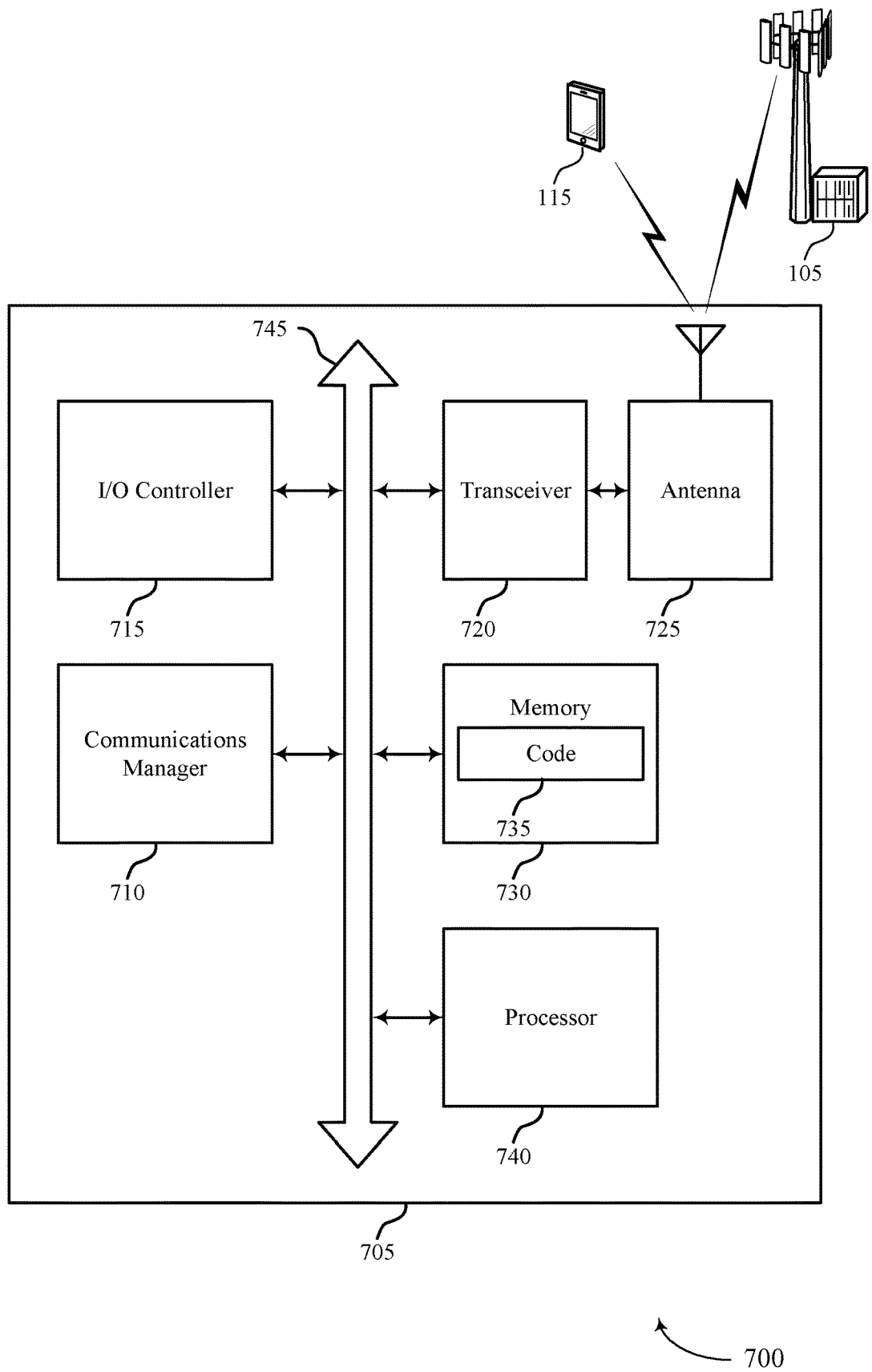
FIG. 7 shows a diagram of a system including a device that supports techniques for release validation of uplink configured grant and SPS in accordance with aspects of the present disclosure.

FIG. 7 shows a diagram of a system 700 including a device 705 that supports techniques for release validation of uplink configured grant and SPS in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive DCI for releasing semi-statically configured communications at the UE, identify respective values of a set of fields within the DCI, where a value of a resource allocation field from the set of fields is based on a configured resource allocation type, and validate that the DCI releases the semi-statically configured communications based on the respective values that include the value of the resource allocation field. The communications manager 710 may also receive DCI for releasing semi-statically configured communications at the UE, identify respective values of a set of fields within the DCI, each of the respective values of the set of fields including a predetermined value, and validate that the DCI releases the semi-statically configured communications based on the predetermined values of the set of fields. The communications manager 710 may also receive DCI for releasing semi-statically configured communications at the UE, identify, within the DCI, a first set of fields and a second set of fields different from the first set of fields, and validate that the DCI releases the semi-statically configured communications based on a value of one or more fields from the first set of fields or the second set of fields.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases, the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for release validation of uplink configured grant and SPS).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
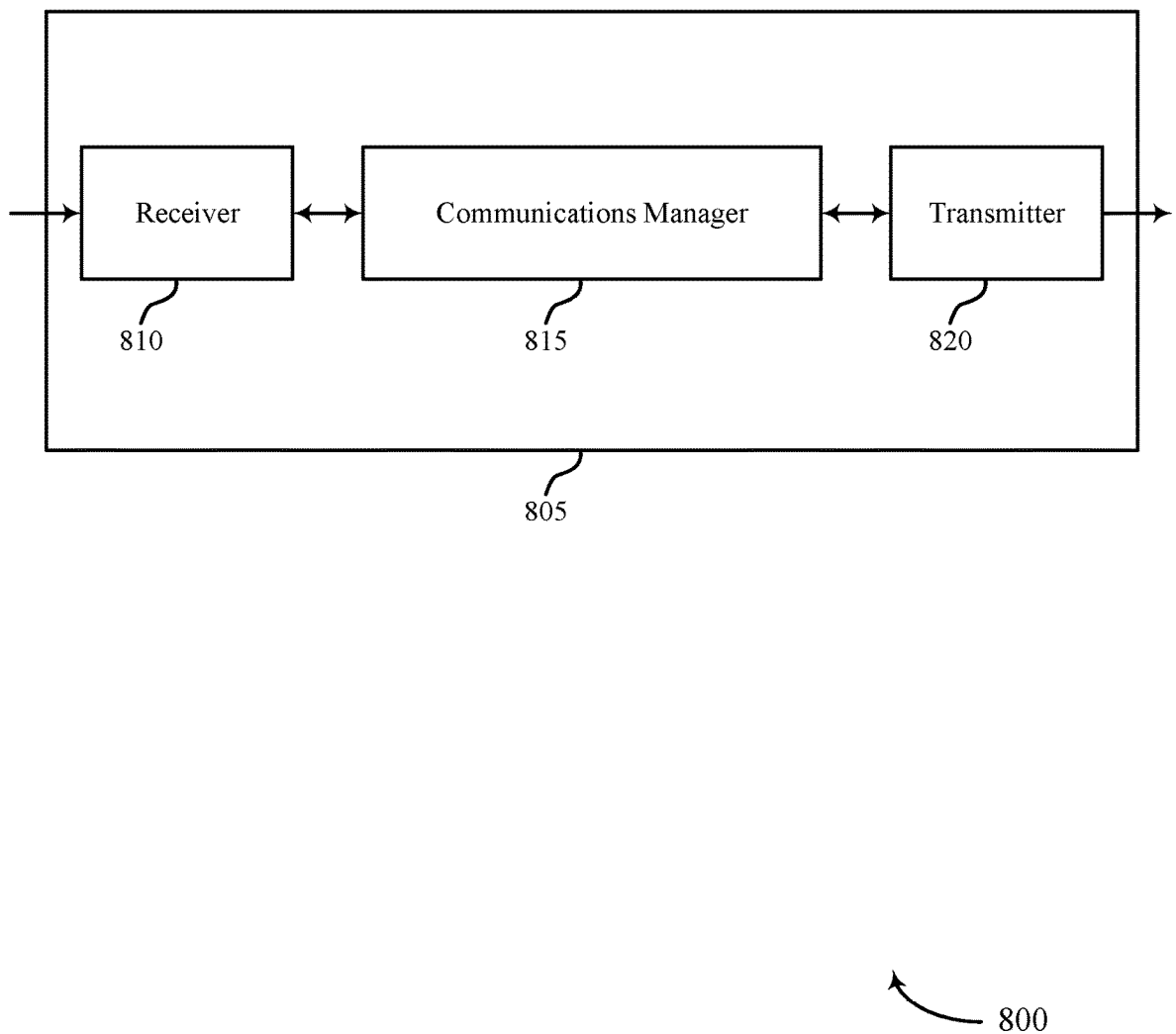
FIGS. 8 and 9 show block diagrams of devices that support techniques for release validation of uplink configured grant and SPS in accordance with aspects of the present disclosure.

FIG. 8 shows a block diagram 800 of a device 805 that supports techniques for release validation of uplink configured grant and SPS in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for release validation of uplink configured grant and SPS). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine to release semi-statically configured communications at a UE, identify a configuration of a resource allocation type, select, based on the determination, a value of a resource allocation field within the DCI, the value being based on the configuration of the resource allocation type, and transmit, to the UE, the DCI for releasing the semi-statically configured communications at the UE, the release of the semi-statically configured communications being indicated based on the value of the resource allocation field within the DCI. The communications manager 815 may also determine to release semi-statically configured communications at a UE, select, based on the determination, respective values of a set of fields within the DCI, each of the respective values of the set of fields including a predetermined value, and transmit, to the UE, the DCI for releasing the semi-statically configured communications at the UE, the release of the semi-statically configured communications being indicated based on the predetermined values of the set of fields. The communications manager 815 may also determine to release semi-statically configured communications at a UE, select, based on the determination, a value of one or more fields within the DCI, where the one or more fields are from at least one of a first set of fields or a second set of fields, and transmit, to the UE, the DCI for releasing the semi-statically configured communications at the UE, the release of the semi-statically configured communications being indicated based on the value of the one or more fields from the first set of fields or the second set of fields. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
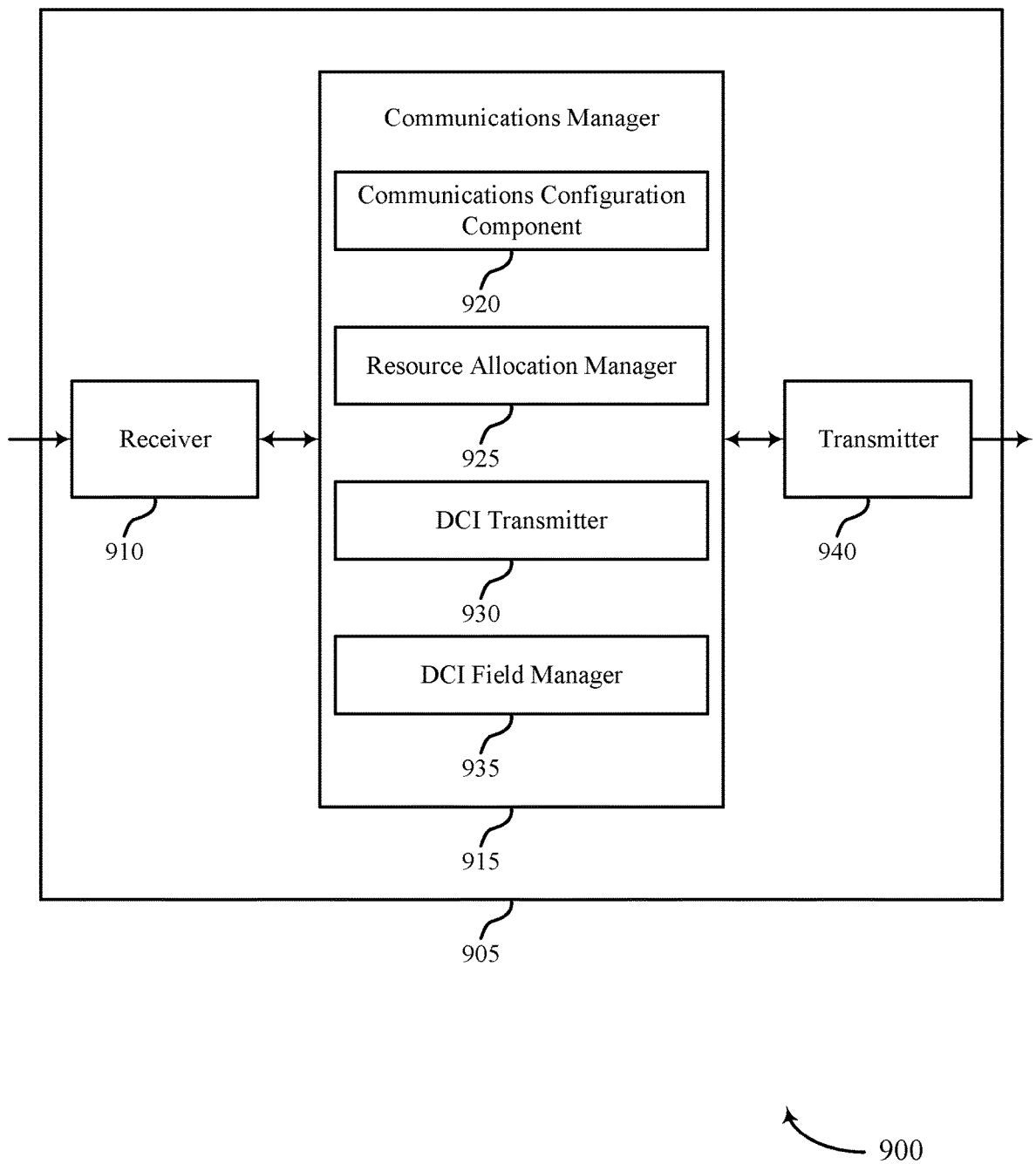

FIG. 9 shows a block diagram 900 of a device 905 that supports techniques for release validation of uplink configured grant and SPS in accordance with aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to techniques for release validation of uplink configured grant and SPS). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a communications configuration component 920, a resource allocation manager 925, a DCI transmitter 930, and a DCI field manager 935. The communications manager 915 may be an example of aspects of the communications manager 1110 described herein.

The communications configuration component 920 may determine to release semi-statically configured communications at a UE. The resource allocation manager 925 may identify a configuration of a resource allocation type and select, based on the determination, a value of a resource allocation field within the DCI, the value being based on the configuration of the resource allocation type. The DCI transmitter 930 may transmit, to the UE, the DCI for releasing the semi-statically configured communications at the UE, the release of the semi-statically configured communications being indicated based on the value of the resource allocation field within the DCI.

The communications configuration component 920 may determine to release semi-statically configured communications at a UE. The DCI field manager 935 may select, based on the determination, respective values of a set of fields within the DCI, each of the respective values of the set of fields including a predetermined value. The DCI transmitter 930 may transmit, to the UE, the DCI for releasing the semi-statically configured communications at the UE, the release of the semi-statically configured communications being indicated based on the predetermined values of the set of fields.

The communications configuration component 920 may determine to release semi-statically configured communications at a UE. The DCI field manager 935 may select, based on the determination, a value of one or more fields within the DCI, where the one or more fields are from at least one of a first set of fields or a second set of fields. The DCI transmitter 930 may transmit, to the UE, the DCI for releasing the semi-statically configured communications at the UE, the release of the semi-statically configured communications being indicated based on the value of the one or more fields from the first set of fields or the second set of fields.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
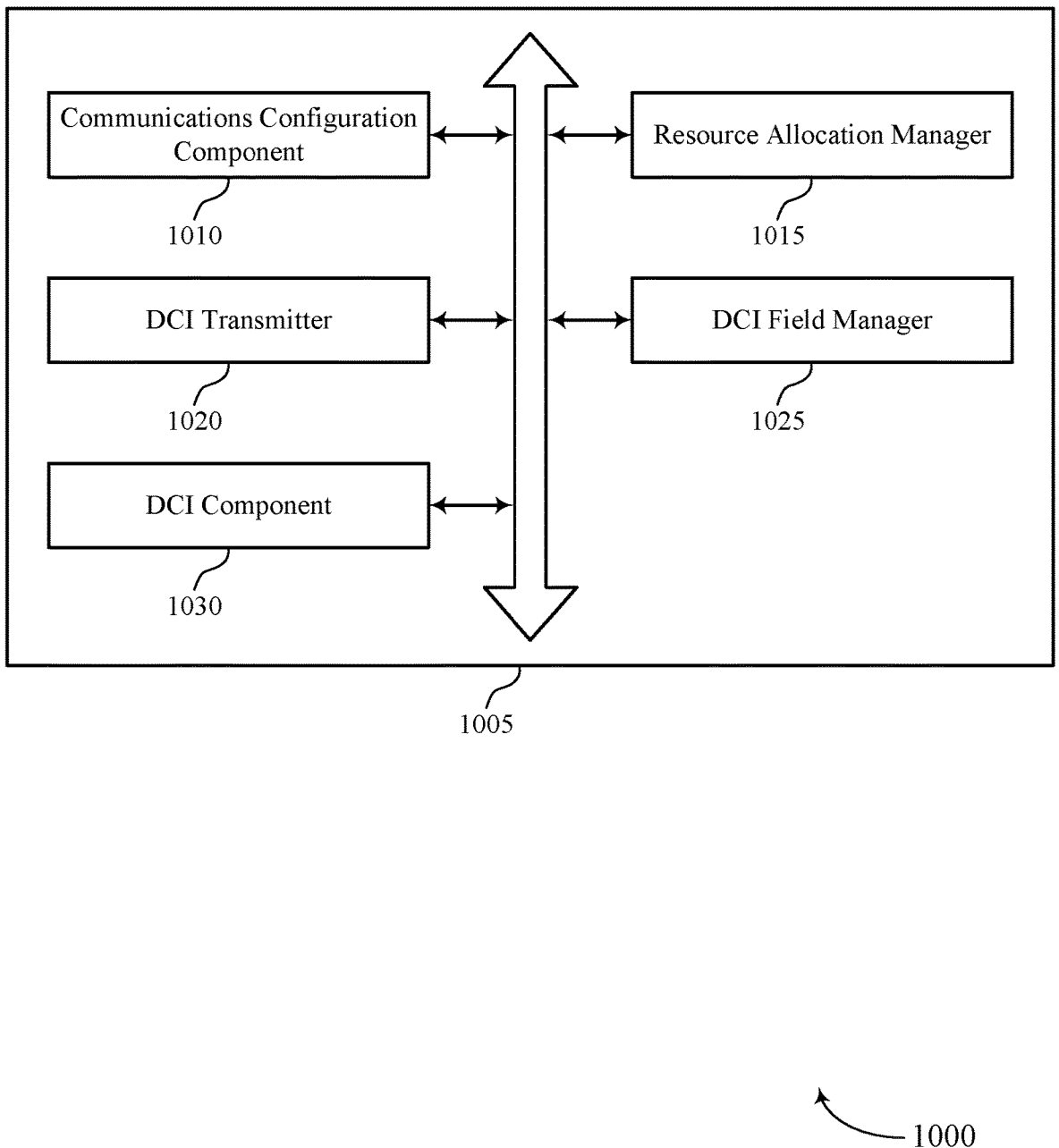
FIG. 10 shows a block diagram of a communications manager that supports techniques for release validation of uplink configured grant and SPS in accordance with aspects of the present disclosure.

FIG. 10 shows a block diagram 1000 of a communications manager 1005 that supports techniques for release validation of uplink configured grant and SPS in accordance with aspects of the present disclosure. The communications manager 1005 may be an example of aspects of a communications manager 815, a communications manager 915, or a communications manager 1110 described herein. The communications manager 1005 may include a communications configuration component 1010, a resource allocation manager 1015, a DCI transmitter 1020, a DCI field manager 1025, and a DCI component 1030. Each of these modules may communicate, directly or indirectly, with one another (e.g., via one or more buses).

The communications configuration component 1010 may determine to release semi-statically configured communications at a UE. In some examples, the communications configuration component 1010 may determine to release semi-statically configured communications at a UE. In some examples, the communications configuration component 1010 may determine to release semi-statically configured communications at a UE.

In some examples, the communications configuration component 1010 may identify a configuration index for the semi-statically configured communications at the UE. In some cases, the semi-statically configured communications include at least one of downlink SPS or an uplink Type 2 configured grant.

The resource allocation manager 1015 may identify a configuration of a resource allocation type. In some examples, the resource allocation manager 1015 may select, based on the determination, a value of a resource allocation field within the DCI, the value being based on the configuration of the resource allocation type.

In some examples, identifying that the configuration of the resource allocation type includes a first type of resource allocation, the value of the resource allocation field being based on the first type of resource allocation, where the value of the resource allocation field corresponds to an invalid allocation.

In some cases, the first type of resource allocation includes a bitmap-based resource allocation, and where the value of the resource allocation field includes a set of 1's. In some cases, the first type of resource allocation includes a resource indicator value-based resource allocation, and where the value of the resource allocation field includes a set of 0's. In some cases, the first type of resource allocation includes a dynamic switch resource allocation type, and where the value of the resource allocation field includes a set of 0's or a set of 1's.

The DCI transmitter 1020 may transmit, to the UE, the DCI for releasing the semi-statically configured communications at the UE, the release of the semi-statically configured communications being indicated based on the value of the resource allocation field within the DCI.

In some examples, the DCI transmitter 1020 may transmit, to the UE, the DCI for releasing the semi-statically configured communications at the UE, the release of the semi-statically configured communications being indicated based on the predetermined values of the set of fields.

In some examples, the DCI transmitter 1020 may transmit, to the UE, the DCI for releasing the semi-statically configured communications at the UE, the release of the semi-statically configured communications being indicated based on the value of the one or more fields from the first set of fields or the second set of fields. In some cases, a CRC of the DCI is scrambled using a configured scheduling radio network temporary identifier.

The DCI field manager 1025 may select, based on the determination, respective values of a set of fields within the DCI, each of the respective values of the set of fields including a predetermined value.

In some examples, the DCI field manager 1025 may select, based on the determination, a value of one or more fields within the DCI, where the one or more fields are from at least one of a first set of fields or a second set of fields.

In some examples, the DCI field manager 1025 may include, within at least one field of the DCI, the configuration index for indicating the semi-statically configured communications at the UE to be released.

In some examples, selecting a value of a resource allocation field includes a set of 1's, a value of a HARQ process field includes a 0, a value of an RV field includes 00, and a value of an MCS field includes a set of 0's, where validating that the DCI releases the semi-statically configured communications based on at least one of the value of the resource allocation field, the value of the RV field, the value of the HARQ process field, or the value of the MCS field.

In some examples, the DCI field manager 1025 may select a value of a first field of the first set of fields that indicates a release of semi-statically configured uplink communications at the UE and a release of semi-statically configured downlink communications at the UE, the value of the first field corresponding to an invalid assignment, where the release of the semi-statically configured communications is validated based on the invalid assignment.

In some examples, the DCI field manager 1025 may select a value of a first field of the first set of fields that indicates a release of semi-statically configured uplink communications at the UE, the value of the first field corresponding to an invalid assignment, where the release of the semi-statically configured communications is validated based on the invalid assignment.

In some examples, the DCI field manager 1025 may identify a value of a second field of the second set of fields that indicates a release of semi-statically configured downlink communications at the UE, the value of the second field corresponding to invalid assignment, where the release of the semi-statically configured communications is validated based on the invalid assignment.

In some cases, the first set of fields includes a resource allocation field, a HARQ process field, an RV field, and an MCS field, where the DCI releasing the semi-statically configured communications is based on a value of one or more fields from the second set of fields.

The DCI component 1030 may configure a type of resource allocation for the UE. In some cases, the DCI includes non-fall back DCI. In some cases, a format of the DCI includes format 0_1, and where the semi-statically configured communications include an uplink Type 2 configured grant. In some cases, a format of the DCI includes format 1_1, and where the semi-statically configured communications include downlink SPS.

Figure 11:
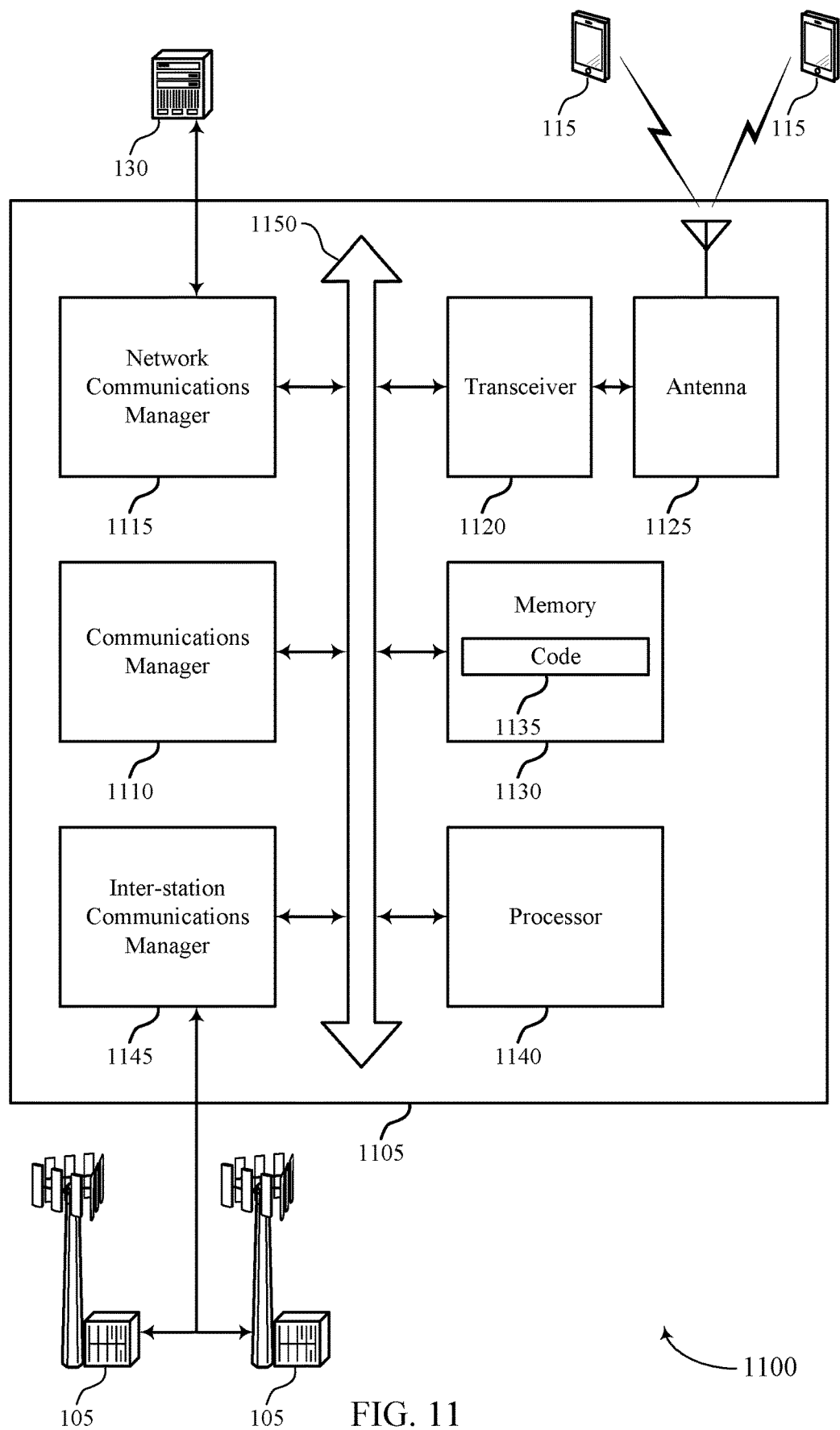
FIG. 11 shows a diagram of a system including a device that supports techniques for release validation of uplink configured grant and SPS in accordance with aspects of the present disclosure.

FIG. 11 shows a diagram of a system 1100 including a device 1105 that supports techniques for release validation of uplink configured grant and SPS in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may determine to release semi-statically configured communications at a UE, identify a configuration of a resource allocation type, select, based on the determination, a value of a resource allocation field within the DCI, the value being based on the configuration of the resource allocation type, and transmit, to the UE, the DCI for releasing the semi-statically configured communications at the UE, the release of the semi-statically configured communications being indicated based on the value of the resource allocation field within the DCI. The communications manager 1110 may also determine to release semi-statically configured communications at a UE, select, based on the determination, respective values of a set of fields within the DCI, each of the respective values of the set of fields including a predetermined value, and transmit, to the UE, the DCI for releasing the semi-statically configured communications at the UE, the release of the semi-statically configured communications being indicated based on the predetermined values of the set of fields. The communications manager 1110 may also determine to release semi-statically configured communications at a UE, select, based on the determination, a value of one or more fields within the DCI, where the one or more fields are from at least one of a first set of fields or a second set of fields, and transmit, to the UE, the DCI for releasing the semi-statically configured communications at the UE, the release of the semi-statically configured communications being indicated based on the value of the one or more fields from the first set of fields or the second set of fields.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for release validation of uplink configured grant and SPS).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
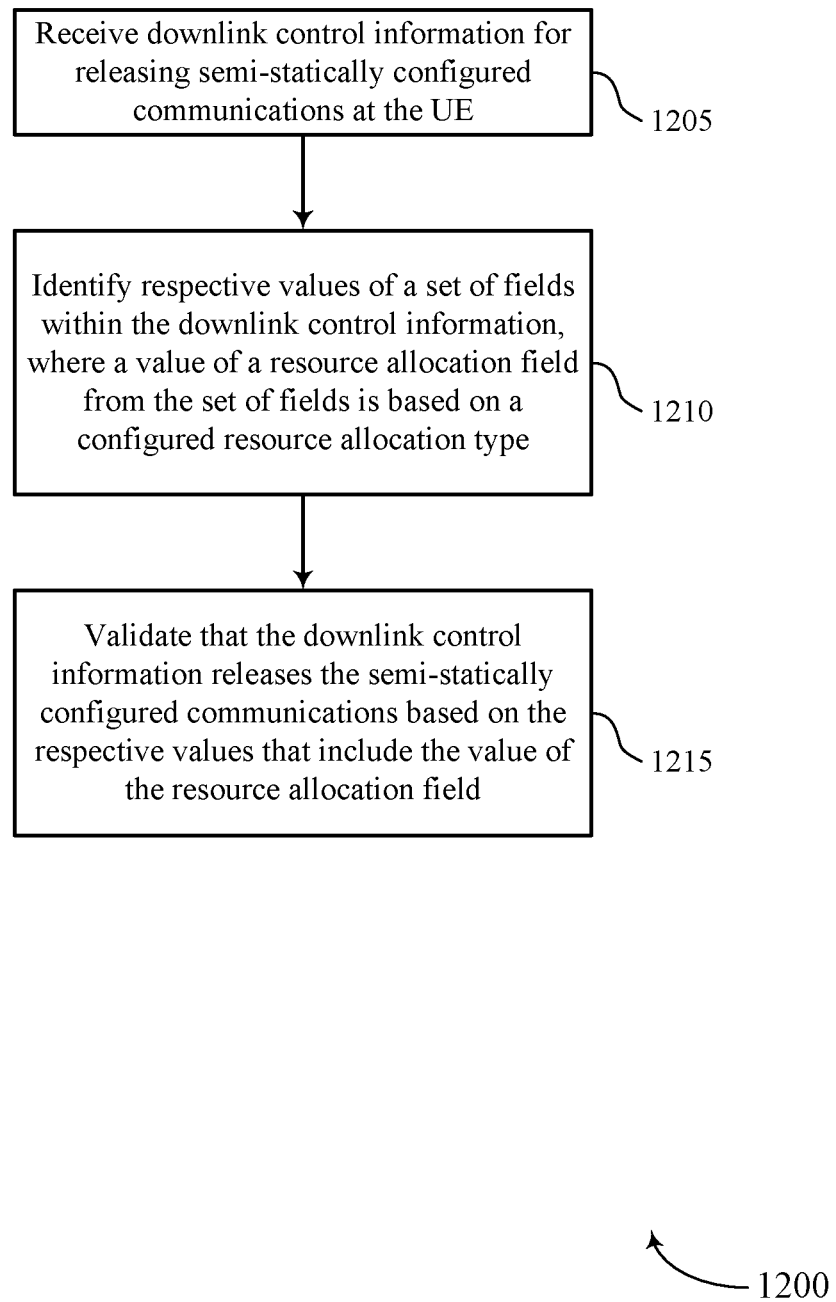
FIGS. 12 through 17 show flowcharts illustrating methods that support techniques for release validation of uplink configured grant and SPS in accordance with aspects of the present disclosure.

FIG. 12 shows a flowchart illustrating a method 1200 that supports techniques for release validation of uplink configured grant and SPS in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive DCI for releasing semi-statically configured communications at the UE. The operations of 1205 may be performed according to the methods described herein. In some examples, aspects of the operations of 1205 may be performed by a DCI receiver as described with reference to FIGS. 4 through 7.

At 1210, the UE may identify respective values of a set of fields within the DCI, where a value of a resource allocation field from the set of fields is based on a configured resource allocation type. The operations of 1210 may be performed according to the methods described herein. In some examples, aspects of the operations of 1210 may be performed by a DCI field component as described with reference to FIGS. 4 through 7.

At 1215, the UE may validate that the DCI releases the semi-statically configured communications based on the respective values that include the value of the resource allocation field. The operations of 1215 may be performed according to the methods described herein. In some examples, aspects of the operations of 1215 may be performed by a DCI validation component as described with reference to FIGS. 4 through 7.

Figure 13:
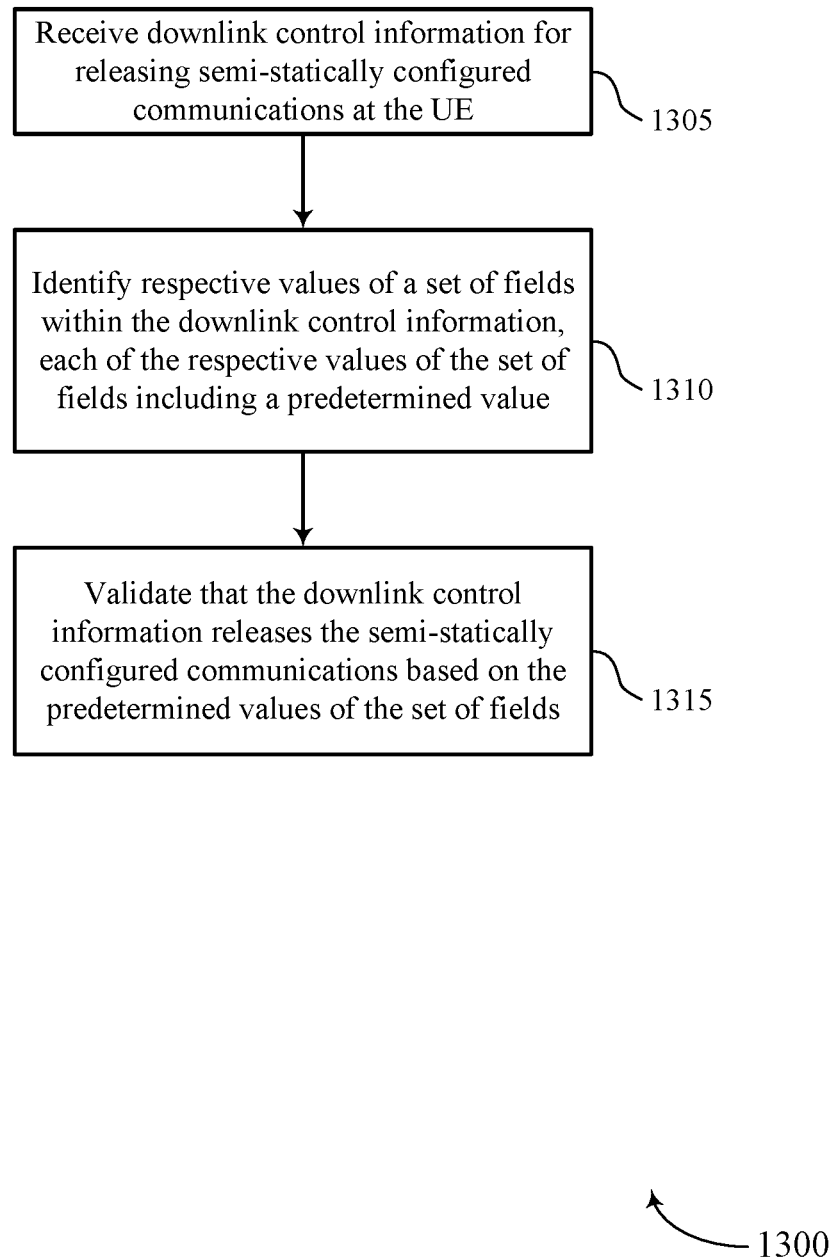

FIG. 13 shows a flowchart illustrating a method 1300 that supports techniques for release validation of uplink configured grant and SPS in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive DCI for releasing semi-statically configured communications at the UE. The operations of 1305 may be performed according to the methods described herein. In some examples, aspects of the operations of 1305 may be performed by a DCI receiver as described with reference to FIGS. 4 through 7.

At 1310, the UE may identify respective values of a set of fields within the DCI, each of the respective values of the set of fields including a predetermined value. The operations of 1310 may be performed according to the methods described herein. In some examples, aspects of the operations of 1310 may be performed by a DCI field component as described with reference to FIGS. 4 through 7.

At 1315, the UE may validate that the DCI releases the semi-statically configured communications based on the predetermined values of the set of fields. The operations of 1315 may be performed according to the methods described herein. In some examples, aspects of the operations of 1315 may be performed by a DCI validation component as described with reference to FIGS. 4 through 7.

Figure 14:
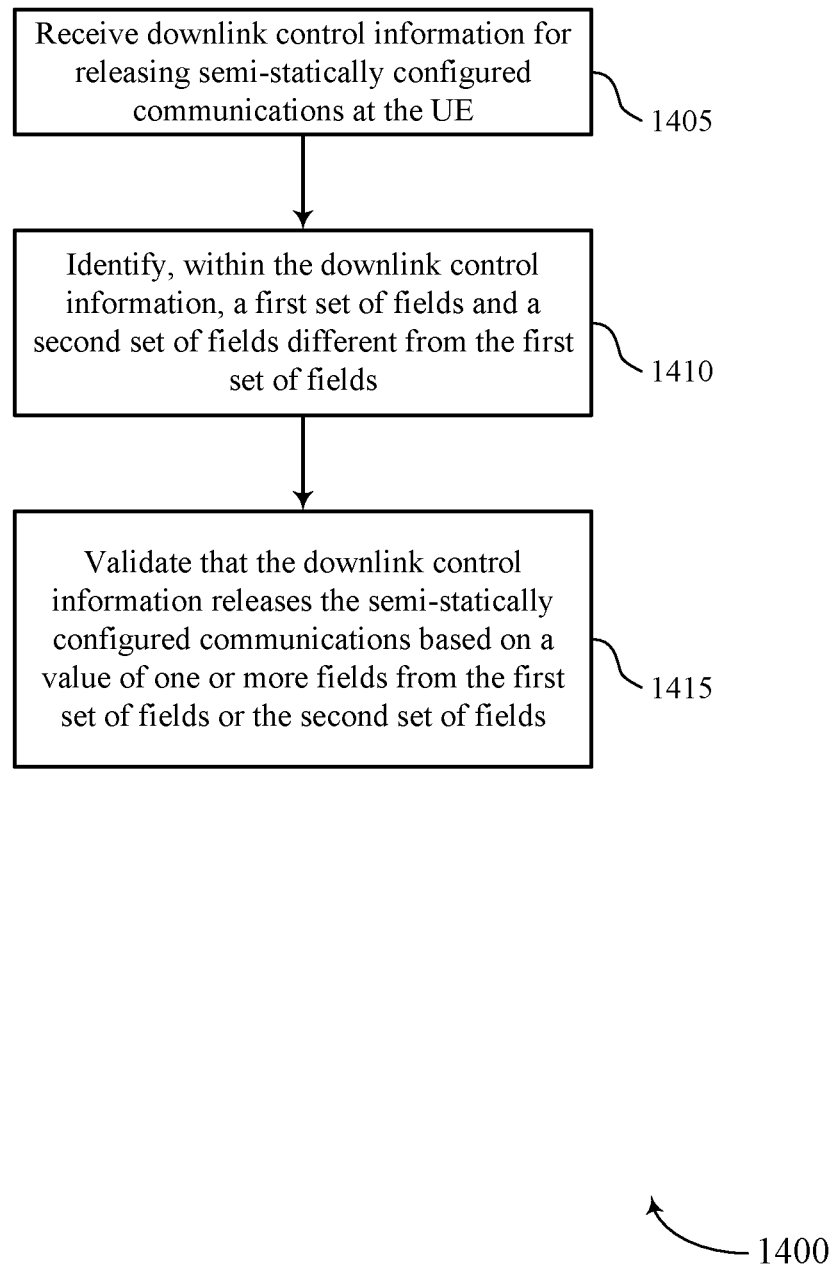

FIG. 14 shows a flowchart illustrating a method 1400 that supports techniques for release validation of uplink configured grant and SPS in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may receive DCI for releasing semi-statically configured communications at the UE. The operations of 1405 may be performed according to the methods described herein. In some examples, aspects of the operations of 1405 may be performed by a DCI receiver as described with reference to FIGS. 4 through 7.

At 1410, the UE may identify, within the DCI, a first set of fields and a second set of fields different from the first set of fields. The operations of 1410 may be performed according to the methods described herein. In some examples, aspects of the operations of 1410 may be performed by a DCI field component as described with reference to FIGS. 4 through 7.

At 1415, the UE may validate that the DCI releases the semi-statically configured communications based on a value of one or more fields from the first set of fields or the second set of fields. The operations of 1415 may be performed according to the methods described herein. In some examples, aspects of the operations of 1415 may be performed by a DCI validation component as described with reference to FIGS. 4 through 7.

Figure 15:
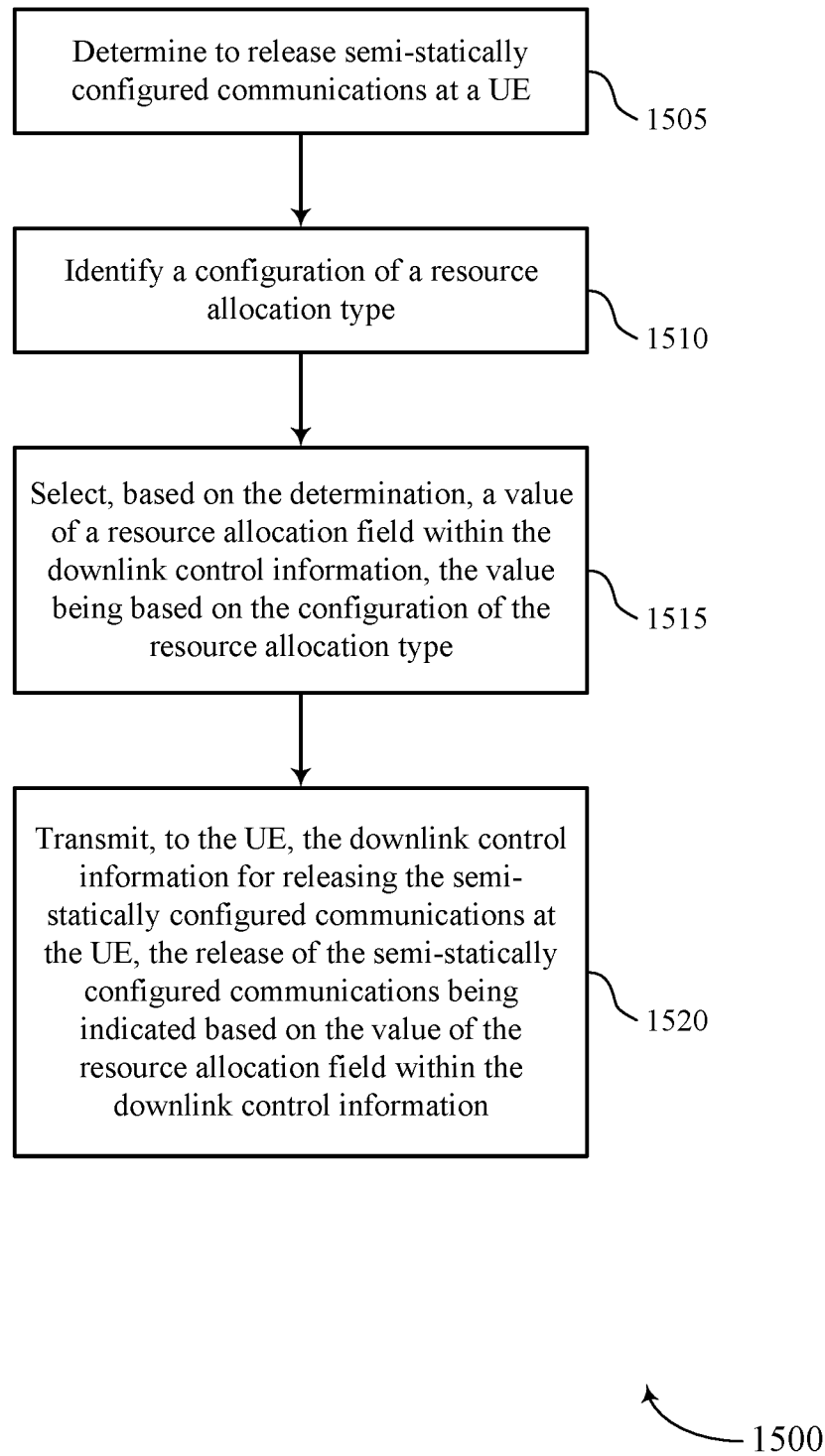

FIG. 15 shows a flowchart illustrating a method 1500 that supports techniques for release validation of uplink configured grant and SPS in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may determine to release semi-statically configured communications at a UE. The operations of 1505 may be performed according to the methods described herein. In some examples, aspects of the operations of 1505 may be performed by a communications configuration component as described with reference to FIGS. 8 through 11.

At 1510, the base station may identify a configuration of a resource allocation type. The operations of 1510 may be performed according to the methods described herein. In some examples, aspects of the operations of 1510 may be performed by a resource allocation manager as described with reference to FIGS. 8 through 11.

At 1515, the base station may select, based on the determination, a value of a resource allocation field within the DCI, the value being based on the configuration of the resource allocation type. The operations of 1515 may be performed according to the methods described herein. In some examples, aspects of the operations of 1515 may be performed by a resource allocation manager as described with reference to FIGS. 8 through 11.

At 1520, the base station may transmit, to the UE, the DCI for releasing the semi-statically configured communications at the UE, the release of the semi-statically configured communications being indicated based on the value of the resource allocation field within the DCI. The operations of 1520 may be performed according to the methods described herein. In some examples, aspects of the operations of 1520 may be performed by a DCI transmitter as described with reference to FIGS. 8 through 11.

Figure 16:
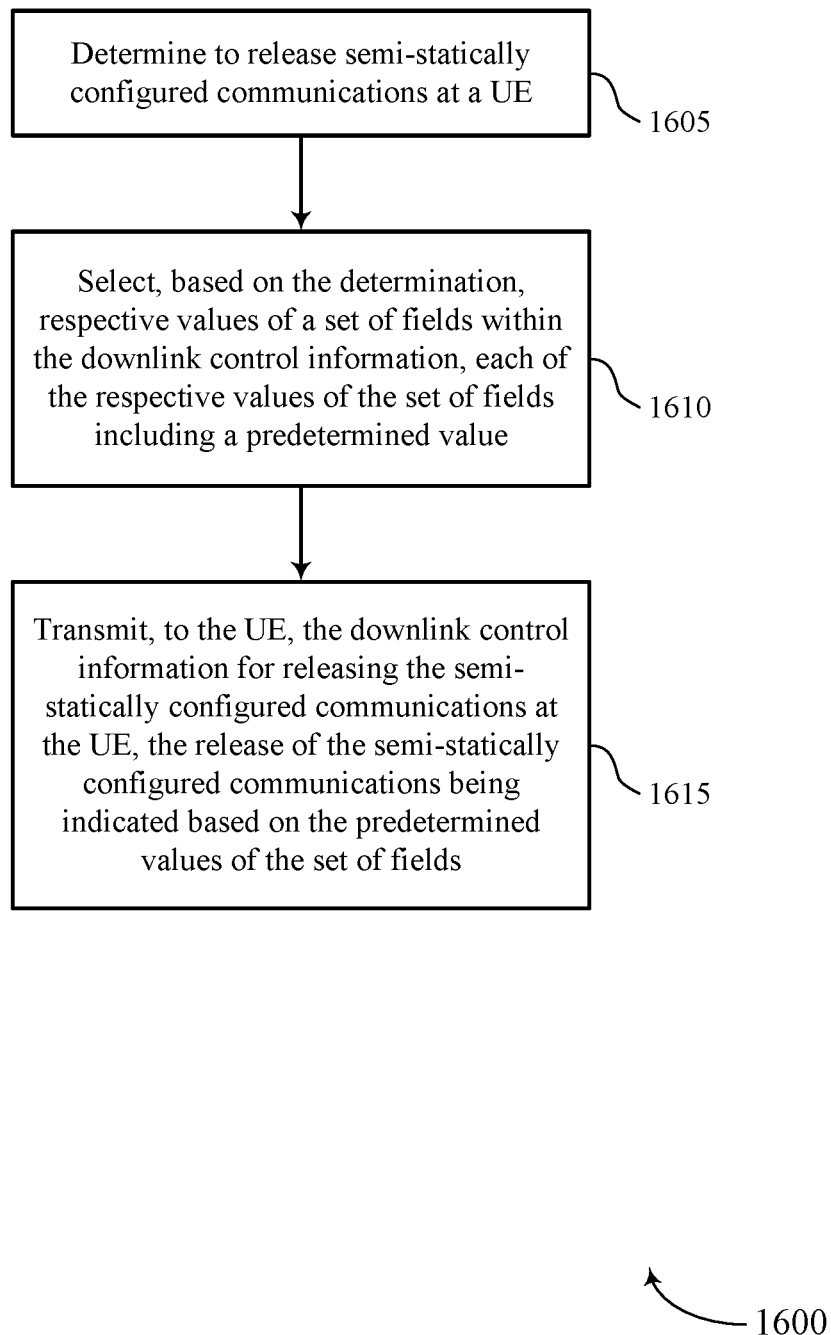

FIG. 16 shows a flowchart illustrating a method 1600 that supports techniques for release validation of uplink configured grant and SPS in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may determine to release semi-statically configured communications at a UE. The operations of 1605 may be performed according to the methods described herein. In some examples, aspects of the operations of 1605 may be performed by a communications configuration component as described with reference to FIGS. 8 through 11.

At 1610, the base station may select, based on the determination, respective values of a set of fields within the DCI, each of the respective values of the set of fields including a predetermined value. The operations of 1610 may be performed according to the methods described herein. In some examples, aspects of the operations of 1610 may be performed by a DCI field manager as described with reference to FIGS. 8 through 11.

At 1615, the base station may transmit, to the UE, the DCI for releasing the semi-statically configured communications at the UE, the release of the semi-statically configured communications being indicated based on the predetermined values of the set of fields. The operations of 1615 may be performed according to the methods described herein. In some examples, aspects of the operations of 1615 may be performed by a DCI transmitter as described with reference to FIGS. 8 through 11.

Figure 17:
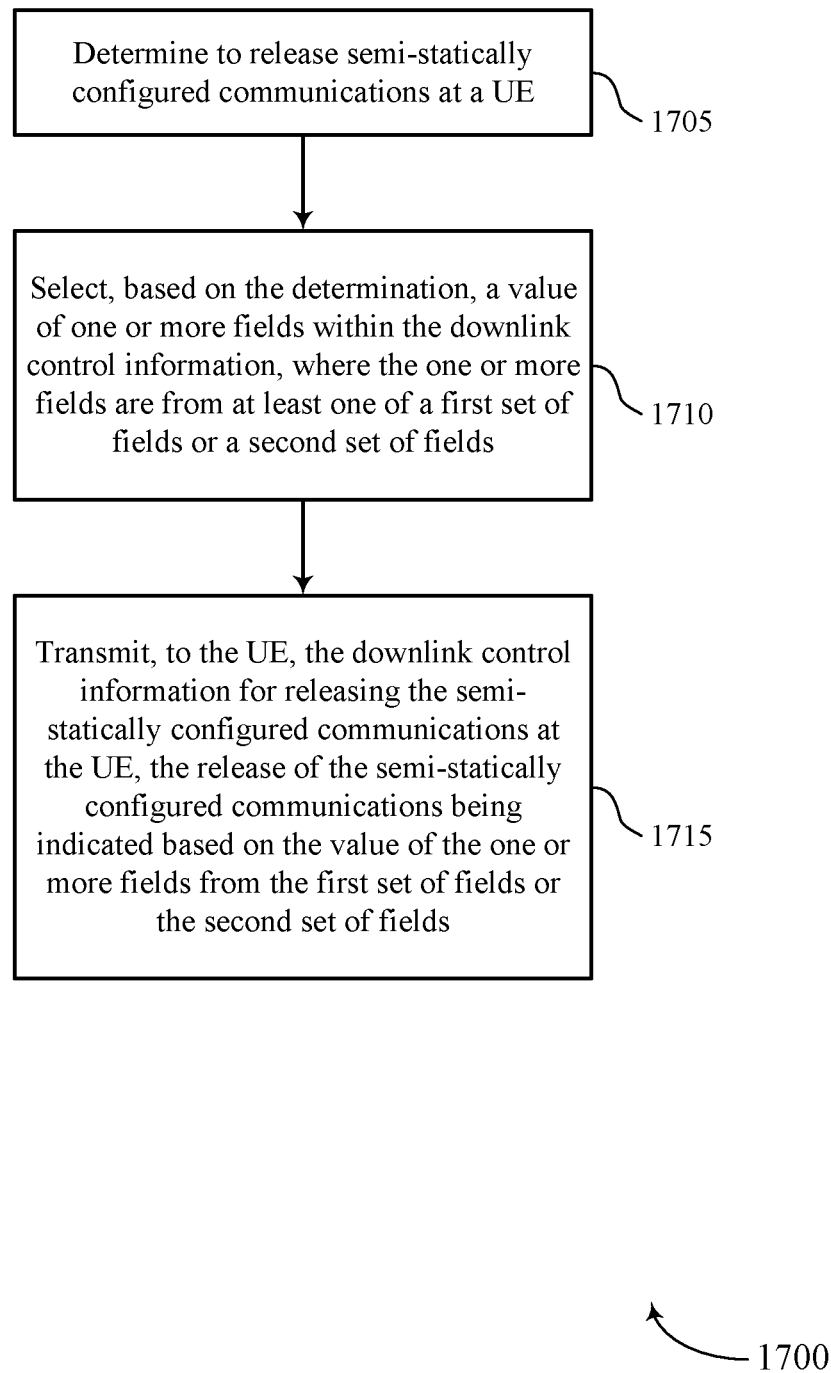

FIG. 17 shows a flowchart illustrating a method 1700 that supports techniques for release validation of uplink configured grant and SPS in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1705, the base station may determine to release semi-statically configured communications at a UE. The operations of 1705 may be performed according to the methods described herein. In some examples, aspects of the operations of 1705 may be performed by a communications configuration component as described with reference to FIGS. 8 through 11.

At 1710, the base station may select, based on the determination, a value of one or more fields within the DCI, where the one or more fields are from at least one of a first set of fields or a second set of fields. The operations of 1710 may be performed according to the methods described herein. In some examples, aspects of the operations of 1710 may be performed by a DCI field manager as described with reference to FIGS. 8 through 11.

At 1715, the base station may transmit, to the UE, the DCI for releasing the semi-statically configured communications at the UE, the release of the semi-statically configured communications being indicated based on the value of the one or more fields from the first set of fields or the second set of fields. The operations of 1715 may be performed according to the methods described herein. In some examples, aspects of the operations of 1715 may be performed by a DCI transmitter as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Various aspects of the described techniques are provided. Aspect 1 is a method of a wireless communication system at a UE that includes receiving DCI for releasing semi-statically configured communications at the UE, identifying respective values of a set of fields within the DCI, where a value of a resource allocation field from the set of fields is based at least in part on a configured resource allocation type, and validating that the DCI releases the semi-statically configured communications based at least in part on the respective values that include the value of the resource allocation field.

In aspect 2, the method of validating that the DCI releases the semi-statically configured communications of aspect 1 includes validating that the DCI releases the semi-statically configured communications based at least in part on the value of the resource allocation field including a first value if the configured resource allocation type is a first type of resource allocation and validating that the DCI releases the semi-statically configured communications based at least in part on the value of the resource allocation field including a second value if the configured resource allocation type is a second type of resource allocation.

In aspect 3, the method of any of aspects 1-2 further includes identifying that the configured resource allocation type includes a first type of resource allocation, the value of the resource allocation field being based at least in part on the first type of resource allocation, where the value of the resource allocation field corresponds to an invalid allocation.

In aspect 4, the method of any of aspects 1-3 further includes where the first type of resource allocation includes a resource indicator value-based resource allocation, and where the value of the resource allocation field includes a set of 1's.

In aspect 5, the method of any of aspects 1-4 further includes where the first type of resource allocation includes a bitmap-based resource allocation, and where the value of the resource allocation field includes a set of 0's.

In aspect 6, the method of any of aspects 1-5 further includes where the first type of resource allocation includes a dynamic switch resource allocation type, and where the value of the resource allocation field includes a set of 0's or a set of 1's.

In aspect 7, the method of any of aspects 1-6 further includes identifying, within at least one field of the set of fields, a configuration index for the semi-statically configured communications at the UE, where validating that the DCI releases the semi-statically configured communications is based at least in part on the identified configuration index and the configured resource allocation type.

In aspect 8, the method of any of aspects 1-7 further includes where the DCI includes non-fall back DCI.

In aspect 9, the method of any of aspects 1-8 further includes where a format of the DCI includes format 0_1, and where the semi-statically configured communications include an uplink Type 2 configured grant.

In aspect 10, the method of any of aspects 1-8 further includes where a format of the DCI includes format 1_1, and where the semi-statically configured communications include downlink SPS In aspect 11, the method of any of aspects 1-10 further includes where a CRC of the DCI is scrambled using a configured scheduling radio network temporary identifier.

Aspect 12 is a method of a wireless communication system at a UE that includes receiving DCI for releasing semi-statically configured communications at the UE, identifying respective values of a set of fields within the DCI, each of the respective values of the set of fields including a predetermined value, and validating that the DCI releases the semi-statically configured communications based at least in part on the predetermined values of the set of fields.

In aspect 13, the method of aspect 12 further includes where the set of fields includes one or more of a resource allocation field, a HARQ process field, an RV field, or an MCS field, where validating that the DCI releases the semi-statically configured communications is based at least in part on at least one of a value of the resource allocation field, a value of the RV field, a value of the HARQ process field, or a value of the MCS field.

In aspect 14, the method of any of aspects 12-13 further includes where at least one of the value of the resource allocation field, the value of the RV field, the value of the HARQ process field, or the value of the MCS field corresponds to an invalid assignment.

In aspect 15, the method of any of aspects 12-14 further includes where a value of the resource allocation field includes a set of 1's, a value of the HARQ process field includes a 0, a value of the RV field includes 00, and a value of the MCS field includes a set of 0's.

Aspect 16 is a method of a wireless communication system at a UE that includes receiving DCI for releasing semi-statically configured communications at the UE, identifying, within the DCI, a first set of fields and a second set of fields different from the first set of fields, and validating that the DCI releases the semi-statically configured communications based at least in part on a value of one or more fields from the first set of fields or the second set of fields.

In aspect 17, the method of aspect 16 further includes where the first set of fields includes a resource allocation field, a HARQ process field, an RV field, and an MCS field, and where validating that the DCI releases the semi-statically configured communications is based at least in part on a value of one or more fields from the second set of fields, where the value of the one or more fields corresponds to an invalid allocation.

In aspect 18, the method of any of aspects 16-17 further includes identifying, from the first set of fields, a value of a first field that indicates a release of semi-statically configured uplink communications at the UE and a release of semi-statically configured downlink communications at the UE, the value of the first field corresponding to an invalid assignment, where validating that the DCI releases the semi-statically configured communications is based at least in part on the invalid assignment.

In aspect 19, the method of any of aspects 16-18 further includes identifying, from the first set of fields, a value of a first field that indicates a release of semi-statically configured uplink communications at the UE, the value of the first field corresponding to an invalid assignment, where validating that the DCI releases the semi-statically configured communications is based at least in part on the invalid assignment and identifying, from the second set of fields, a value of a second field that indicates a release of semi-statically configured downlink communications at the UE, the value of the second field corresponding to an invalid assignment, where validating that the DCI releases the semi-statically configured communications is based at least in part on the invalid assignment.

In aspect 20, the method of any of aspects 16-19 further includes where the semi-statically configured communications include at least one of downlink SPS or an uplink Type 2 configured grant.

Aspect 21 is a method of a wireless communication system at a base station that includes determining to release semi-statically configured communications at a UE, identifying a configuration of a resource allocation type, selecting, based at least in part on the determination, a value of a resource allocation field within the DCI, the value being based at least in part on the configuration of the resource allocation type, transmitting, to the UE, the DCI for releasing the semi-statically configured communications at the UE, the release of the semi-statically configured communications being indicated based at least in part on the value of the resource allocation field within the DCI.

In aspect 22, the method of aspect 21 further includes identifying that the configuration of the resource allocation type includes a first type of resource allocation, the value of the resource allocation field being based at least in part on the first type of resource allocation, where the value of the resource allocation field corresponds to an invalid allocation.

In aspect 23, the method of any of aspects 21-22 further includes where the first type of resource allocation includes a bitmap-based resource allocation, and where the value of the resource allocation field includes a set of 1's.

In aspect 24, the method of any of aspects 21-23 further includes where the first type of resource allocation includes a resource indicator value-based resource allocation, and where the value of the resource allocation field includes a set of 0's In aspect 25, the method of any of aspects 21-24 further includes where the first type of resource allocation includes a dynamic switch resource allocation type, and where the value of the resource allocation field includes a set of 0's or a set of 1's.

In aspect 26, the method of any of aspects 21-25 further includes identifying a configuration index for the semi-statically configured communications at the UE and including, within at least one field of the DCI, the configuration index for indicating the semi-statically configured communications at the UE to be released.

In aspect 27, the method of any of aspects 21-26 further includes where the DCI includes non-fall back DCI In aspect 28, the method of any of aspects 26-27 further includes where a format of the DCI includes format 0_1, and where the semi-statically configured communications include an uplink Type 2 configured grant.

In aspect 29, the method of any of aspects 26-27 further includes where a format of the DCI includes format 1_1, and where the semi-statically configured communications include downlink SPS.

In aspect 30, the method of any of aspects 21-22 further includes where a CRC of the DCI is scrambled using a configured scheduling radio network temporary identifier.

Aspect 31 is a method of a wireless communication system at a base station that includes determining to release semi-statically configured communications at a UE, selecting, based at least in part on the determination, respective values of a set of fields within the DCI, each of the respective values of the set of fields including a predetermined value, and transmitting, to the UE, the DCI for releasing the semi-statically configured communications at the UE, the release of the semi-statically configured communications being indicated based at least in part on the predetermined values of the set of fields.

In aspect 32, the method of aspect 31 further includes selecting a value of a resource allocation field includes a set of 1's, a value of a HARQ process field includes a 0, a value of an RV field includes 00, and a value of an MCS field includes a set of 0's, where validating that the DCI releases the semi-statically configured communications based at least in part on at least one of the value of the resource allocation field, the value of the RV field, the value of the HARQ process field, or the value of the MCS field.

Aspect 33 is a method of a wireless communication system at a base station that includes determining to release semi-statically configured communications at a UE, selecting, based at least in part on the determination, a value of one or more fields within the DCI, where the one or more fields are from at least one of a first set of fields or a second set of fields, and transmitting, to the UE, the DCI for releasing the semi-statically configured communications at the UE, the release of the semi-statically configured communications being indicated based at least in part on the value of the one or more fields from the first set of fields or the second set of fields.

In aspect 34, the method of aspect 33 further includes where the first set of fields includes a resource allocation field, a HARQ process field, an RV field, and an MCS field, and where that the DCI releasing the semi-statically configured communications is based at least in part on a value of one or more fields from the second set of fields.

In aspect 35, the method of any of aspects 33-34 further includes selecting a value of a first field of the first set of fields that indicates a release of semi-statically configured uplink communications at the UE and a release of semi-statically configured downlink communications at the UE, the value of the first field corresponding to an invalid assignment, where the release of the semi-statically configured communications is validated based at least in part on the invalid assignment.

In aspect 36, the method of any of aspects 33-35 further includes selecting a value of a first field of the first set of fields that indicates a release of semi-statically configured uplink communications at the UE, the value of the first field corresponding to an invalid assignment, where the release of the semi-statically configured communications is validated based at least in part on the invalid assignment and identifying a value of a second field of the second set of fields that indicates a release of semi-statically configured downlink communications at the UE, the value of the second field corresponding to invalid assignment, where the release of the semi-statically configured communications is validated based at least in part on the invalid assignment.

In aspect 37, the method of any of aspects 33-36 further includes where the semi-statically configured communications include at least one of downlink SPS or an uplink Type 2 configured grant.

Aspect 38 is a system or apparatus including means for implementing a method or realizing an apparatus as in any of aspects 1-37.

Aspect 39 is a non-transitory computer-readable medium storing instructions executable by one or more processors to cause the one or more processors to implement a method as in any of aspects 1-37.

Aspect 40 is a system including one or more processors and memory in electronic communication with the one or more processors storing instructions executable by the one or more processors to cause the system or apparatus to implement a method as in any of aspects 1-37

Aspects 1 through 40 (or aspects of the aspects 1 through 40) may be combined with aspects or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving control signaling configuring the UE with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;
   receiving downlink control information for releasing semi-statically configured communications at the UE, the downlink control information comprising a set of fields, wherein a third value of the resource allocation field of the set of fields is based at least in part on the first resource allocation type; and
   validating that the downlink control information releases the semi-statically configured communications based at least in part on respective values of the set of fields that include the third value of the resource allocation field.

2. The method of claim 1, further comprising:
   identifying the first resource allocation type, wherein validating that the downlink control information releases the semi-statically configured communications is based at least in part on the first resource allocation type.

3. The method of claim 1, further comprising:
   identifying the first resource allocation type, wherein the third value of the resource allocation field comprises the first value corresponding to the invalid allocation.

4. The method of claim 3, wherein the first resource allocation type comprises a resource indicator value-based resource allocation, and wherein the third value of the resource allocation field comprises a plurality of 1s.

5. The method of claim 3, wherein the first resource allocation type comprises a bitmap-based resource allocation, and wherein the third value of the resource allocation field comprises a plurality of 0s.

6. The method of claim 3, wherein the first resource allocation type comprises a dynamic switch resource allocation type, and wherein the third value of the resource allocation field comprises a plurality of 0s or a plurality of 1s.

7. The method of claim 1, wherein the downlink control information jointly releases a plurality of configurations for semi-statically configured communications, the method further comprising:
   identifying, within at least one field of the set of fields, a configuration index for the semi-statically configured communications at the UE, wherein validating that the downlink control information releases the semi-statically configured communications is based at least in part on the identified configuration index and the first resource allocation type.

8. The method of claim 1, wherein the downlink control information comprises non-fall back downlink control information.

9. The method of claim 8, wherein a format of the downlink control information comprises format 0_1, and wherein the semi-statically configured communications comprise an uplink Type 2 configured grant.

10. The method of claim 8, wherein a format of the downlink control information comprises format 1_1, and wherein the semi-statically configured communications comprise downlink semi-persistent scheduling.

11. The method of claim 1, wherein a cyclic redundancy check of the downlink control information is scrambled using a configured scheduling radio network temporary identifier.

12. A method for wireless communication at a user equipment (UE), comprising:
    receiving downlink control information for releasing semi-statically configured communications at the UE, the downlink control information comprising a set of fields, wherein a value of a modulation and coding scheme (MCS) field of the set of fields comprises a plurality of 0s, and wherein respective values of the set of fields comprises a predetermined value and at least two of the values of a resource allocation field, a value of a redundancy version (RV) field, a value of a hybrid automatic repeat request (HARQ) process field, or the value of the MCS field correspond to an invalid assignment; and
    validating that the downlink control information releases the semi-statically configured communications based at least in part on the value of the MCS field comprising the plurality of 0s.

13. The method of claim 12, wherein the set of fields comprises one or more of the resource allocation field, the HARQ process field, or the RV field, wherein validating that the downlink control information releases the semi-statically configured communications is based at least in part on at least one of the value of the resource allocation field, the value of the RV field, or the value of the HARQ process field.

14. The method of claim 13, wherein a value of the resource allocation field comprises a plurality of 1s, a value of the HARQ process field comprises a 0, and a value of the RV field comprises 00.

15. A method for wireless communication at a user equipment (UE), comprising:
receiving downlink control information for releasing semi-statically configured communications at the UE, wherein the downlink control information comprises a first set of fields and a second set of fields different from the first set of fields, the first set of fields comprising a resource allocation field, a hybrid automatic repeat request (HARQ) process field, a redundancy version (RV) field, and a modulation and coding scheme (MCS) field; and
validating that the downlink control information releases the semi-statically configured communications based at least in part on a value of one or more fields from the second set of fields.

16. The method of claim 15, wherein the value of the one or more fields corresponds to an invalid allocation.

17. The method of claim 15, further comprising:
identifying, from the first set of fields, a value of a first field that indicates a release of semi-statically configured uplink communications at the UE and a release of semi-statically configured downlink communications at the UE, the value of the first field corresponding to an invalid assignment, wherein validating that the downlink control information releases the semi-statically configured communications is based at least in part on the invalid assignment.

18. The method of claim 15, further comprising:
identifying, from the first set of fields, a value of a first field that indicates a release of semi-statically configured uplink communications at the UE, the value of the first field corresponding to an invalid assignment, wherein validating that the downlink control information releases the semi-statically configured communications is based at least in part on the invalid assignment; and
identifying, from the second set of fields, a value of a second field that indicates a release of semi-statically configured downlink communications at the UE, the value of the second field corresponding to an invalid assignment, wherein validating that the downlink control information releases the semi-statically configured communications is based at least in part on the invalid assignment.

19. The method of claim 15, wherein the semi-statically configured communications comprise at least one of downlink semi-persistent scheduling or an uplink Type 2 configured grant.

20. A method for wireless communication at a network device, comprising:
transmitting control signaling configuring a user equipment (UE) with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;
selecting, based at least in part on releasing semi-statically configured communications at the UE, a third value of the resource allocation field within downlink control information, the third value being based at least in part on the first resource allocation type; and
transmitting, to the UE, the downlink control information for releasing the semi-statically configured communications at the UE, the release of the semi-statically configured communications being indicated based at least in part on the third value of the resource allocation field within the downlink control information.

21. The method of claim 20, further comprising:
identifying the first resource allocation type, wherein the third value of the resource allocation field comprises the first value corresponding to the invalid allocation.

22. The method of claim 21, wherein the first resource allocation type comprises a bitmap-based resource allocation, and wherein the third value of the resource allocation field comprises a plurality of 1s.

23. The method of claim 21, wherein the first resource allocation type comprises a resource indicator value-based resource allocation, and wherein the third value of the resource allocation field comprises a plurality of 0s.

24. The method of claim 21, wherein the first resource allocation type comprises a dynamic switch resource allocation type, and wherein the third value of the resource allocation field comprises a plurality of 0s or a plurality of 1s.

25. The method of claim 20, wherein the downlink control information jointly releases a plurality of configurations for semi-statically configured communications, the method further comprising:
identifying a configuration index for the semi-statically configured communications at the UE; and
including, within at least one field of the downlink control information, the configuration index for indicating the semi-statically configured communications at the UE to be released.

26. The method of claim 20, wherein the downlink control information comprises non-fall back downlink control information.

27. The method of claim 26, wherein a format of the downlink control information comprises format 0_1, and wherein the semi-statically configured communications comprise an uplink Type 2 configured grant.

28. The method of claim 26, wherein a format of the downlink control information comprises format 1_1, and wherein the semi-statically configured communications comprise downlink semi-persistent scheduling.

29. The method of claim 20, wherein a cyclic redundancy check of the downlink control information is scrambled using a configured scheduling radio network temporary identifier.

30. A method for wireless communication at a network device, comprising:
selecting, based at least in part on releasing semi-statically configured communications at a user equipment (UE), respective values of a set of fields within downlink control information, wherein a value of a modulation and coding scheme (MCS) field of the set of fields comprises a plurality of 0s, and wherein each respective value of the set of fields comprises a predetermined value and at least two of the values of a resource allocation field, a value of a redundancy version (RV) field, a value of a hybrid automatic repeat request (HARQ) process field, or the value of the MCS field correspond to an invalid assignment; and transmitting, to the UE, the downlink control information for releasing the semi-statically configured communications at the UE, the release of the semi-statically configured communications being indicated based at least in part on the value of the MCS field comprising the plurality of 0s.

31. The method of claim 30, wherein:

the value of the resource allocation field comprises a plurality of 1s, the value of the HARQ process field comprises a 0, and the value of the RV field comprises 00, wherein validating that the downlink control information releases the semi-statically configured communications based at least in part on at least one of the value of the resource allocation field, the value of the RV field, or the value of the HARQ process field.

32. A method for wireless communication at a network device, comprising:

selecting, based at least in part on releasing semi-statically configured communications at a user equipment (UE), a value of one or more fields within downlink control information, wherein the one or more fields are from at least one of a first set of fields or a second set of fields different from the first set of fields, the first set of fields comprising a resource allocation field, a hybrid automatic repeat request (HARM) process field, redundancy version (RV) field, and a modulation and coding scheme (MCS) field; and transmitting, to the UE, the downlink control information for releasing the semi-statically configured communications at the UE, the release of the semi-statically configured communications being indicated based at least in part on the value of the one or more fields from the second set of fields.

33. The method of claim 32, wherein the value of the one or more fields from the second set of fields corresponds to an invalid allocation.

34. The method of claim 32, further comprising:

selecting a value of a first field of the first set of fields that indicates a release of semi-statically configured uplink communications at the UE and a release of semi-statically configured downlink communications at the UE, the value of the first field corresponding to an invalid assignment, wherein the release of the semi-statically configured communications is validated based at least in part on the invalid assignment.

35. The method of claim 32, further comprising:

selecting a value of a first field of the first set of fields that indicates a release of semi-statically configured uplink communications at the UE, the value of the first field corresponding to an invalid assignment, wherein the release of the semi-statically configured communications is validated based at least in part on the invalid assignment; and identifying a value of a second field of the second set of fields that indicates a release of semi-statically configured downlink communications at the UE, the value of the second field corresponding to invalid assignment, wherein the release of the semi-statically configured communications is validated based at least in part on the invalid assignment.

36. The method of claim 32, wherein the semi-statically configured communications comprise at least one of downlink semi-persistent scheduling or an uplink Type 2 configured grant.

37. An apparatus for wireless communication at a user equipment (UE), comprising:

a processor, memory coupled with the processor; and one or more instructions stored in the memory and executable by the processor to cause the apparatus to:

receive control signaling configuring the UE with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;

receive downlink control information for releasing semi-statically configured communications at the UE, the downlink control information comprising a set of fields, wherein a third value of the resource allocation field of the set of fields is based at least in part on the first resource allocation type; and validate that the downlink control information releases the semi-statically configured communications based at least in part on respective values of the set of fields that include the third value of the resource allocation field.

38. The apparatus of claim 37, wherein the instructions are further executable by the processor to cause the apparatus to:

identify the first resource allocation type, wherein validating that the downlink control information releases the semi-statically configured communications is based at least in part on the first resource allocation type.

39. The apparatus of claim 37, wherein the instructions are further executable by the processor to cause the apparatus to:

identify the first resource allocation type, wherein the third value of the resource allocation field comprises the first value corresponding to the invalid allocation.

40. The apparatus of claim 39, wherein the first resource allocation type comprises a resource indicator value-based resource allocation, and wherein the third value of the resource allocation field comprises a plurality of 1s.

41. The apparatus of claim 39, wherein the first resource allocation type comprises a bitmap-based resource allocation, and wherein the third value of the resource allocation field comprises a plurality of 0s.

42. The apparatus of claim 39, wherein the first resource allocation type comprises a dynamic switch resource allocation type, and wherein the third value of the resource allocation field comprises a plurality of 0s.

43. An apparatus for wireless communication at a user equipment (UE), comprising:

a processor, memory coupled with the processor; and one or more instructions stored in the memory and executable by the processor to cause the apparatus to:

receive downlink control information for releasing semi-statically configured communications at the UE, the downlink control information comprising a set of fields, wherein a value of a modulation and coding scheme (MCS) field of the set of fields comprises a plurality of 0s, and wherein respective values of the set of fields comprises a predetermined value and at least two of the values of a resource allocation field, a value of a redundancy version (RV) field, a value of a hybrid automatic repeat request (HARQ) process field, or the value of the MCS field correspond to an invalid assignment; and validate that the downlink control information releases the semi-statically configured communications based at least in part on the value of the MCS field comprising the plurality of 0s.

44. The apparatus of claim 43, wherein the set of fields comprises one or more of the resource allocation field, the HARQ process field, or the RV field, wherein validating that the downlink control information releases the semi-statically configured communications is based at least in part on at least one of the value of the resource allocation field, the value of the RV field, or the value of the HARQ process field.

45. The apparatus of claim 44, wherein the value of the resource allocation field comprises a plurality of 1s, the value of the HARQ process field comprises a 0, and the value of the RV field comprises 00.

46. An apparatus for wireless communication at a user equipment (UE), comprising:
a processor,
memory coupled with the processor; and
one or more instructions stored in the memory and executable by the processor to cause the apparatus to:
receive downlink control information for releasing semi-statically configured communications at the UE, wherein the downlink control information comprises a first set of fields and a second set of fields different from the first set of fields, the first set of fields comprising a resource allocation field, a hybrid automatic repeat request (HARQ) process field, a redundancy version (RV) field, and a modulation and coding scheme (MCS) field; and
validate that the downlink control information releases the semi-statically configured communications based at least in part on a value of one or more fields from the second set of fields.

47. The apparatus of claim 46, wherein the value of the one or more fields corresponds to an invalid allocation.

48. The apparatus of claim 46, wherein the instructions are further executable by the processor to cause the apparatus to:
identify, from the first set of fields, a value of a first field that indicates a release of semi-statically configured uplink communications at the UE and a release of semi-statically configured downlink communications at the UE, the value of the first field corresponding to an invalid assignment, wherein validating that the downlink control information releases the semi-statically configured communications is based at least in part on the invalid assignment.

49. The apparatus of claim 46, wherein the instructions are further executable by the processor to cause the apparatus to:
identify, from the first set of fields, a value of a first field that indicates a release of semi-statically configured uplink communications at the UE, the value of the first field corresponding to an invalid assignment, wherein validating that the downlink control information releases the semi-statically configured communications is based at least in part on the invalid assignment; and
identify, from the second set of fields, a value of a second field that indicates a release of semi-statically configured downlink communications at the UE, the value of the second field corresponding to an invalid assignment, wherein validating that the downlink control information releases the semi-statically configured communications is based at least in part on the invalid assignment.

50. An apparatus for wireless communication at a network device, comprising:
a processor,
memory coupled with the processor; and
one or more instructions stored in the memory and executable by the processor to cause the apparatus to:
transmit control signaling configuring a user equipment (UE) with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;
select, based at least in part on releasing semi-statically configured communications at a user equipment (UE), a third value of the resource allocation field within downlink control information, the third value being based at least in part on the first resource allocation type; and
transmit, to the UE, the downlink control information for releasing the semi-statically configured communications at the UE, the release of the semi-statically configured communications being indicated based at least in part on the third value of the resource allocation field within the downlink control information.

51. The apparatus of claim 50, wherein the instructions are further executable by the processor to cause the apparatus to:
identify the first resource allocation type, wherein the third value of the resource allocation field comprises the first value corresponding to the invalid allocation.

52. The apparatus of claim 51, wherein the first resource allocation type comprises a bitmap-based resource allocation, and wherein the third value of the resource allocation field comprises a plurality of 1s.

53. The apparatus of claim 51, wherein the first resource allocation type comprises a resource indicator value-based resource allocation, and wherein the third value of the resource allocation field comprises a plurality of 0s.

54. The apparatus of claim 51, wherein the first resource allocation type comprises a dynamic switch resource allocation type, and wherein the third value of the resource allocation field comprises a plurality of 0s or a plurality of 1s.

55. An apparatus for wireless communication at a network device, comprising:
a processor,
memory coupled with the processor; and
one or more instructions stored in the memory and executable by the processor to cause the apparatus to:
select, based at least in part on releasing semi-statically configured communications at a user equipment (UE), respective values of a set of fields within downlink control information, wherein a value of a modulation and coding scheme (MCS) field of the set of fields comprises a plurality of 0s, and wherein each respective values of the set of fields comprises a predetermined value and at least two of the values of a resource allocation field, a value of a redundancy version (RV) field, a value of a hybrid automatic repeat request (HARQ) process field, or the value of the MCS field correspond to an invalid assignment; and transmit, to the UE, the downlink control information for releasing the semi-statically configured communications at the UE, the release of the semi-statically configured communications being indicated based at least in part on the value of the MCS field comprising the plurality of 0s.

56. The apparatus of claim 55, wherein:
the value of the resource allocation field comprises a plurality of 1s, the value of the HARQ process field comprises a 0, and the value of the RV field comprises 00, wherein validating that the downlink control information releases the semi-statically configured communications based at least in part on at least one of the value of the resource allocation field, the value of the RV field, or the value of the HARQ process field.

57. An apparatus for wireless communication at a network device, comprising:
a processor,
memory coupled with the processor; and
one or more instructions stored in the memory and executable by the processor to cause the apparatus to:
select, based at least in part on releasing semi-statically configured communications at a user equipment (UE), a value of one or more fields within downlink control information, wherein the one or more fields are from at least one of a first set of fields or a second set of fields, the first set of fields comprising a resource allocation field, a hybrid automatic repeat request (HARM) process field, redundancy version (RV) field, and a modulation and coding scheme (MCS) field; and
transmit, to the UE, the downlink control information for releasing the semi-statically configured communications at the UE, the release of the semi-statically configured communications being indicated based at least in part on the value of the one or more fields from the second set of fields.

58. The apparatus of claim 57, wherein the value of the one or more fields from the second set of fields corresponds to an invalid allocation.

59. The apparatus of claim 57, wherein the instructions are further executable by the processor to cause the apparatus to:
select a value of a first field of the first set of fields that indicates a release of semi-statically configured uplink communications at the UE and a release of semi-statically configured downlink communications at the UE, the value of the first field corresponding to an invalid assignment, wherein the release of the semi-statically configured communications is validated based at least in part on the invalid assignment.

60. An apparatus for wireless communication at a user equipment (UE), comprising:
means for receiving control signaling configuring the UE with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;
means for receiving downlink control information for releasing semi-statically configured communications at the UE, the downlink control information comprising a set of fields, wherein a third value of the resource allocation field of the set of fields is based at least in part on the first resource allocation type; and
means for validating that the downlink control information releases the semi-statically configured communications based at least in part on respective values of the set of fields that include the third value of the resource allocation field.

61. An apparatus for wireless communication at a user equipment (UE), comprising:
means for receiving downlink control information for releasing semi-statically configured communications at the UE, the downlink control information comprising a set of fields, wherein a value of a modulation and coding scheme (MCS) field of the set of fields comprises a plurality of 0s, and wherein respective values of the set of fields comprises a predetermined value and at least two of the values of a resource allocation field, a value of a redundancy version (RV) field, a value of a hybrid automatic repeat request (HARQ) process field, or the value of the MCS field correspond to an invalid assignment; and
means for validating that the downlink control information releases the semi-static ally configured communications based at least in part on the value of the MCS field comprising the plurality of 0s.

62. An apparatus for wireless communication at a user equipment (UE), comprising:
means for receiving downlink control information for releasing semi-statically configured communications at the UE, wherein the downlink control information comprises a first set of fields and a second set of fields different from the first set of fields, the first set of fields comprising a resource allocation field, a hybrid automatic repeat request (HARM) process field, a redundancy version (RV) field, and a modulation and coding scheme (MCS) field; and
means for validating that the downlink control information releases the semi-statically configured communications based at least in part on a value of one or more fields from the second set of fields.

63. An apparatus for wireless communication at a network device, comprising:
means for transmitting control signaling configuring a user equipment (UE) with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;
means for selecting, based at least in part on releasing semi-statically configured communications at a user equipment (UE), a third value of the resource allocation field within downlink control information, the third value being based at least in part on the first resource allocation type; and means for transmitting, to the UE, the downlink control information for releasing the semi-statically configured communications at the UE, the release of the semi-statically configured communications being indicated based at least in part on the third value of the resource allocation field within the downlink control information.

64. An apparatus for wireless communication at a network device, comprising:
   means for selecting, based at least in part on releasing semi-statically configured communications at a user equipment (UE), respective values of a set of fields within downlink control information, wherein a value of a modulation and coding scheme (MCS) field of the set of fields comprises a plurality of 0s, and wherein each respective values of the set of fields comprises a predetermined value; and
   means for transmitting, to the UE, the downlink control information for releasing the semi-statically configured communications at the UE, the release of the semi-statically configured communications being indicated based at least in part on the value of the MCS field comprising the plurality of 0s.

65. An apparatus for wireless communication at a network device, comprising:
   means for selecting, based at least in part on releasing semi-statically configured communications at a user equipment (UE), a value of one or more fields within downlink control information, wherein the one or more fields are from at least one of a first set of fields or a second set of fields different from the first set of fields, the first set of fields comprising a resource allocation field, a hybrid automatic repeat request (HARM) process field, redundancy version (RV) field, and a modulation and coding scheme (MCS) field; and
   means for transmitting, to the UE, the downlink control information for releasing the semi-statically configured communications at the UE, the release of the semi-statically configured communications being indicated based at least in part on the value of the one or more fields from the second set of fields.

66. A non-transitory computer-readable medium storing code for wireless communication at a user equipment (UE), the code comprising instructions executable by a processor to:
   receive control signaling configuring the UE with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;
   receive downlink control information for releasing semi-statically configured communications at the UE, the downlink control information comprising a set of fields, wherein a third value of the resource allocation field of the set of fields is based at least in part on the first resource allocation type; and
   validate that the downlink control information releases the semi-statically configured communications based at least in part on respective values of the set of fields that include the third value of the resource allocation field.

67. A non-transitory computer-readable medium storing code for wireless communication at a user equipment (UE), the code comprising instructions executable by a processor to:
   receive downlink control information for releasing semi-statically configured communications at the UE, the downlink control information comprising a set of fields, wherein a value of a modulation and coding scheme (MCS) field of the set of fields comprises a plurality of 0s, and wherein respective values of the set of fields comprises a predetermined value and at least two of the values of a resource allocation field, a value of a redundancy version (RV) field, a value of a hybrid automatic repeat request (HARQ) process field, or the value of the MCS field correspond to an invalid assignment; and
   validate that the downlink control information releases the semi-statically configured communications based at least in part on the value of the MCS field comprising the plurality of 0s.

68. A non-transitory computer-readable medium storing code for wireless communication at a user equipment (UE), the code comprising instructions executable by a processor to:
   receive downlink control information for releasing semi-statically configured communications at the UE, wherein the downlink control information comprises a first set of fields and a second set of fields different from the first set of fields, the first set of fields comprising a resource allocation field, a hybrid automatic repeat request (HARQ) process field, a redundancy version (RV) field, and a modulation and coding scheme (MCS) field; and
   validate that the downlink control information releases the semi-statically configured communications based at least in part on a value of one or more fields from the second set of fields.

69. A non-transitory computer-readable medium storing code for wireless communication at a network device, the code comprising instructions executable by a processor to:
   transmit control signaling configuring a user equipment (UE) with a first resource allocation type of a set of resource allocation types, the set of resource allocation types comprising the first resource allocation type and a second resource allocation type, wherein a first value of a resource allocation field corresponds to an invalid allocation for the first resource allocation type and a second value of the resource allocation field corresponds to an invalid allocation for the second resource allocation type, the first value being different from the second value;
   select, based at least in part on releasing semi-statically configured communications at a user equipment (UE), a third value of the resource allocation field within downlink control information, the third value being based at least in part on the first resource allocation type; and
   transmit, to the UE, the downlink control information for releasing the semi-statically configured communications at the UE, the release of the semi-statically configured communications being indicated based at least in part on the third value of the resource allocation field within the downlink control information.

70. A non-transitory computer-readable medium storing code for wireless communication at a network device, the code comprising instructions executable by a processor to:

select, based at least in part on releasing semi-statically configured communications at a user equipment (UE), respective values of a set of fields within downlink control information, wherein a value of a modulation and coding scheme (MCS) field of the set of fields comprises a plurality of 0s, and wherein each respective values of the set of fields comprises a predetermined value and at least two of the values of a resource allocation field, a value of a redundancy version (RV) field, a value of a hybrid automatic repeat request (HARQ) process field, or the value of the MCS field correspond to an invalid assignment; and transmit, to the UE, the downlink control information for releasing the semi-statically configured communications at the UE, the release of the semi-statically configured communications being indicated based at least in part on the value of the MCS field comprising the plurality of 0s.

71. A non-transitory computer-readable medium storing code for wireless communication at a network device, the code comprising instructions executable by a processor to:

select, based at least in part on releasing semi-statically configured communications at a user equipment (UE), a value of one or more fields within downlink control information, wherein the one or more fields are from at least one of a first set of fields or a second set of fields, the first set of fields comprising a resource allocation field, a hybrid automatic repeat request (HARQ) process field, redundancy version (RV) field, and a modulation and coding scheme (MCS) field; and transmit, to the UE, the downlink control information for releasing the semi-statically configured communications at the UE, the release of the semi-statically configured communications being indicated based at least in part on the value of the one or more fields from the second set of field.

* * * * *